United States Patent
Stewart

(10) Patent No.: US 9,148,288 B2
(45) Date of Patent: Sep. 29, 2015

(54) CONDITIONAL TELECOMMUNICATIONS

(75) Inventor: Mark Stewart, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 160 days.

(21) Appl. No.: 13/600,127

(22) Filed: Aug. 30, 2012

(65) Prior Publication Data

US 2013/0229948 A1 Sep. 5, 2013

(30) Foreign Application Priority Data

Aug. 31, 2011 (GB) .................................. 1115032.3

(51) Int. Cl.
*H04L 12/16* (2006.01)
*H04M 3/42* (2006.01)
*H04M 3/46* (2006.01)

(52) U.S. Cl.
CPC ........... *H04L 12/16* (2013.01); *H04M 3/42246* (2013.01); *H04M 3/42263* (2013.01); *H04M 3/46* (2013.01); *H04M 2207/20* (2013.01)

(58) Field of Classification Search
CPC ..................... H04M 3/42246; H04M 3/42263; H04M 3/46; H04M 3/465; H04M 3/005; H04L 12/16; H04L 12/66; H04L 29/06; H04L 65/1016; H04L 65/1006; H04L 29/06027; H04L 45/70; H04W 40/00; H04W 68/00; H04W 36/00; H04W 76/026; H04W 4/16; G06F 15/16
USPC ................. 370/352, 221, 328, 252–259, 329; 455/458, 417, 414.1; 709/228, 227; 379/207.02; 705/14.58
See application file for complete search history.

(56) References Cited

U.S. PATENT DOCUMENTS

| 6,978,004 | B1 | 12/2005 | Levine |
| 7,995,562 | B2 * | 8/2011 | Purnadi et al. ................. 370/352 |
| 2004/0248593 | A1 | 12/2004 | Hicks, III et al. |
| 2005/0195802 | A1 | 9/2005 | Klein et al. |
| 2006/0072726 | A1 | 4/2006 | Klein et al. |

(Continued)

FOREIGN PATENT DOCUMENTS

| CN | 101237635 A | 8/2008 |
| EP | 1065900 A1 | 1/2001 |

(Continued)

*Primary Examiner* — Jamal Javaid
*Assistant Examiner* — Wali Butt
(74) *Attorney, Agent, or Firm* — EIP US LLP

(57) ABSTRACT

A subscriber of a telecommunication system has a plurality of associated telecommunication devices which are each contactable via a device-shared identification address. A first device can communicate with a telecommunications network. A second device can communicate with a packet-switched network and a circuit-switched network. A control system receives an incoming telecommunication request associated with an incoming telecommunication request directed to the address, which has been routed to the control system based on the address. A first control phase is initiated where a first outgoing telecommunication request is transmitted over the telecommunications network to the first device and an operation is performed to at least attempt to transmit a second outgoing telecommunication request over the packet-switched network to the second device. If the operation is deemed to be unsuccessful, a second control phase is initiated where a third outgoing telecommunication request is transmitted over the circuit-switched network to the second device.

30 Claims, 11 Drawing Sheets

(56) References Cited

U.S. PATENT DOCUMENTS

| | | |
|---|---|---|
| 2006/0252444 A1 | 11/2006 | Ozugur |
| 2007/0183394 A1 | 8/2007 | Khandelwal et al. |
| 2010/0098057 A1* | 4/2010 | Stewart .......................... 370/352 |
| 2010/0153563 A1* | 6/2010 | Ku ................................ 709/228 |
| 2010/0172347 A1 | 7/2010 | Zisimopoulos |
| 2010/0220719 A1 | 9/2010 | Yi et al. |
| 2010/0331011 A1* | 12/2010 | Vikberg et al. ............ 455/456.1 |
| 2011/0194554 A1* | 8/2011 | Gavita et al. .................. 370/352 |
| 2012/0236709 A1* | 9/2012 | Ramachandran et al. .... 370/221 |
| 2012/0314662 A1* | 12/2012 | Melander et al. ............. 370/329 |

FOREIGN PATENT DOCUMENTS

| | | |
|---|---|---|
| GB | 2429869 A | 3/2007 |
| GB | 2463494 A | 3/2010 |
| WO | 2008071553 A1 | 6/2008 |
| WO | 2008148432 A1 | 12/2008 |
| WO | 2009083737 A2 | 7/2009 |
| WO | 2009097811 A1 | 8/2009 |
| WO | 2010046866 A1 | 4/2010 |

* cited by examiner

CONDITIONAL TELECOMMUNICATIONS

CROSS REFERENCE TO RELATED APPLICATION

This application claims priority to foreign Patent Application No. GB 1115032.3, filed on Aug. 31, 2011, the content of which is hereby incorporated by reference herein in its entirety.

TECHNICAL FIELD

This invention relates to methods and apparatus for providing services to subscribers in a telecommunications system. In particular, but not exclusively, the invention relates to the conditional delivery of telecommunication data to subscribers having multiple telecommunication devices.

BACKGROUND

Telecommunication systems can transfer telecommunication data such as voice calls, video, music, multimedia, text messages, email messages, multimedia messages, facsimiles and/or data. Telecommunication systems transfer telecommunication data between terminals over a telecommunications network. A terminal is a device that can transmit and/or receive telecommunication data. A terminal may be a fixed-line device or a mobile device. Telecommunication data may be transmitted over a telecommunications network using circuit-switching technology or packet-switching technology.

A telephony device is a telecommunication terminal that is suitable for transmitting and receiving voice calls over a telephone network. The telephony device may be a fixed-line telephony device that has a fixed location and communicates over a fixed-line telephone network. The telephony device may be a mobile telephony device that is portable and communicates over a wireless telephone network. The telephony device may transmit and receive the voice call over a circuit-switched telephone network or a packet-switched telephone network.

A Voice over Internet Protocol (VoIP) device is an example of a telephony device that communicates over an Internet Protocol (IP) network, such as the internet. In addition to voice calls, a VoIP device may provide short messaging, video conferencing, facsimile, voice mail, multimedia messaging and/or email. Although a number of different signalling protocols are available, a telephony device communicating over a packet-switched network typically uses Session Initiation Protocol (SIP) as a signalling protocol.

Subscribers have long had to deal with a proliferation of terminals through which third parties may contact them. For example, a business user might have multiple telephony devices including a fixed-line telephone for use in the office and a mobile telephone for use at other locations. Each telephony device has associated advantages; whilst a mobile telephone provides the user with mobility, a fixed-line telephone typically provides less costly call services, no need to recharge a battery, and also better service in areas where there is poor signal strength such as inside a building.

To avoid confusing calling parties with telephone dialling numbers for each of the telephony devices of a subscriber, a one-telephone dialling number telephony service allows a subscriber to publish a single telephone dialling number on which they can be contacted. Thus, when the single telephone dialling number is called, all of the subscriber's telephony devices will ring, for example simultaneously. The subscriber is then able to answer the call at the telephony device of his choosing.

One known attempt to provide one-telephone dialling number telephony services requires each physical telephony device to be assigned a unique telephone number. Hence, when a subscriber's published telephone dialling number is called, the terminating telephony system providing the one-telephone dialling number service will ring each device by establishing separate call legs using each device's unique telephone number. This type of one-telephone dialling number service is commonly referred to as a "SimRing" service.

Another known attempt to provide one-telephone dialling number telephony services can be found where all the telephony devices communicate over a packet-switched network using SIP. Each SIP-compliant telephony device registers contact information, such as IP address, against a common 'address of record' which typically maps to the subscriber's telephone number. When the subscriber's number is called, the terminating telephony system sends (or 'forks') the call to each telephony device using standard procedures found in SIP.

A further known attempt to provide one-telephone dialling number telephony services can be found where each telephony device is supported by a different telecommunications network. In this case, the one-telephone dialling number service uses multiple mechanisms to direct the calls over the different networks. For example, the one-telephone dialling number service may use SIP procedures to fork a call to a SIP compliant telephony device over a packet-switched network and use SimRing procedures to establish a call leg to a mobile telephone over a conventional wireless circuit-switched network using the mobile telephone's unique telephone number.

Following recent developments, telecommunication devices can now be multi-network devices that are configured to communicate with different types of network. For example, the latest generation of mobile telephony devices can now communicate over a packet-switched network in addition to the traditional circuit-switched network. This is achieved by using a "soft client" (a software programme) to establish calls over the packet-switched network. The soft client typically establishes calls over a packet-switched network using SIP as the signalling protocol.

It may be preferable for telephony data to be transferred over the packet-switched network rather than the circuit-switched network. Hence, when the soft client registers against the subscriber's address of record, the subscriber's one-number service will transfer any calls to the mobile telephony device over the packet-switched network, as well as to any other telephony device the subscriber has registered.

However, there may be occasions when the soft client is unreachable (for example, when the mobile telephony device has left the coverage of the WiFi hot spot). Nevertheless, since the mobile telephony device is a multi-network device, the circuit-switch network is usually still available for the transmission of calls.

In principle, a SimRing service could be used simultaneously to ring the mobile telephony device via a circuit-switched network just in case the soft client is unreachable. However, a consequence of this is that whenever the soft client is reachable the mobile telephony device receives the same incoming call via two completely independent paths. This can cause a number of undesirable problems, particularly when the soft client is not tightly integrated with the circuit-switched software. For example:

a conflict can occur between the soft client and the circuit-switched software as they both try to alert the subscriber of an incoming call. Depending on the mobile telephony device, this could result in a confusing user experience, or perhaps one will always "win" (for example, the circuit-switched software may take precedence, denying the user the opportunity to answer the call over the packet-switched network).

differences in the signalling delay paths may mean that the call is received over one path several seconds before it is received over the other path. During this time, the user may have already answered or chosen to ignore the call (for example, by silencing the ringing). However, when the call arrives via the other path, the mobile telephony device starts ringing again.

An "unavailable call forwarding" service is known which could be used instead of the SimRing service—the unavailable call forwarding service could be set up to forward an incoming call to a mobile telephony device when the subscriber doesn't have any telephony devices which are currently reachable. However, the unavailable call forwarding service has limited application because it would fail to ring the mobile telephony device if the subscriber has any other reachable telephony devices registered to the service.

Embodiments of the present invention seek to address or overcome at least some of the above-mentioned problems associated with conventional telecommunication services.

SUMMARY

In accordance with a first aspect of the invention, there is provided a method of providing a telecommunication service to a subscriber of a telecommunication system wherein the subscriber has a plurality of associated telecommunication devices including a first device and a second device, each of said plurality of associated telecommunication devices is contactable via a device-shared identification address, the first device is capable of communicating with a telecommunications network, and the second device is capable of communicating with a packet-switched network and further capable of communicating with a circuit-switched network, wherein the method comprises at a control system:
  receiving an incoming telecommunication request associated with an incoming telecommunication request directed to the device-shared identification address for the subscriber, the incoming telecommunication request having been routed to the control system on the basis of the device-shared identification address;
  initiating a first control phase, and in said first control phase:
    transmitting a first outgoing telecommunication request over the telecommunications network to the first device; and
    performing an operation to at least attempt to transmit a second outgoing telecommunication request over the packet-switched network to the second device, in preference to transmitting an outgoing telecommunication request over the circuit-switched network to the second device; and
  if the operation to at least attempt to transmit the second outgoing telecommunication request is deemed to be unsuccessful, initiating a second control phase, and in said second control phase transmitting a third outgoing telecommunication request over the circuit-switched network to the second device.

In accordance with a second aspect of the invention, there is provided a method of providing a telephony service to a subscriber of a telecommunication system, wherein the subscriber has a plurality of associated telephony devices including a first telephony device and a second telephony device, each of said plurality of associated telephony devices is contactable via a device-shared telephone dialling number, the first telephony device is capable of communicating with a telecommunications network, and the second telephony device is capable of communicating with a packet-switched network and further capable of communicating with a circuit-switched network, wherein the method comprises at a control system:
  receiving an incoming call connection request associated with an incoming call directed to the device-shared telephone dialling number for the subscriber, the incoming call connection request having been routed to the control system on the basis of the device-shared telephone dialling number;
  initiating a first control phase, and in said first control phase:
    transmitting a first outgoing call connection request over the telecommunications network to the first telephony device; and
    performing an operation to at least attempt to transmit a second outgoing call connection request over the packet-switched network to the second telephony device, in preference to transmitting an outgoing call connection request over the circuit-switched network to the second telephony device;
  if the operation to at least attempt to transmit the second outgoing call connection request is deemed to be unsuccessful, initiating a second control phase, and in said second control phase transmitting a third outgoing call connection request over the circuit-switched network to the second telephony device;
  receiving a call connection response from one of the first telephony device and the second telephony device; and
  connecting said incoming call to said one of said first telephony device and the second telephony device.

In accordance with a third aspect of the invention, there is provided apparatus comprising:
  at least one processor; and
  at least one memory including computer program code;
  the at least one memory and the computer program code being configured to cause the processor to perform a method of providing a telecommunication service to a subscriber of a telecommunication system, wherein the subscriber has a plurality of associated telecommunication devices including a first device and a second device, each of said plurality of associated telecommunication devices is contactable via a device-shared identification address, the first device is capable of communicating with a telecommunications network, and the second device is capable of communicating with a packet-switched network and further capable of communicating with a circuit-switched network, wherein the method comprises at a control system:
    receiving an incoming telecommunication request associated with an incoming telecommunication request directed to the device-shared identification address for the subscriber, the incoming telecommunication request having been routed to the control system on the basis of the device-shared identification address,
    initiating a first control phase, and in said first control phase:
      transmitting a first outgoing telecommunication request over the telecommunications network to the first device, and
      performing an operation to at least attempt to transmit a second outgoing telecommunication request over the packet-switched network to the second device, in preference to transmitting an outgoing telecommunication request over the circuit-switched network to the second device, and if the operation to at least attempt to transmit a second outgoing telecommunication request is deemed to be unsuccessful, initiating a second control phase, and in said second control phase transmitting a third outgoing telecommunication request over the circuit-switched network to the second device.

In accordance with a fourth aspect of the invention, there is provided apparatus comprising:

at least one processor; and at least one memory including computer program code;

the at least one memory and the computer program code being configured to cause the processor to perform a method of providing a telephony service to a subscriber of a telecommunication system, wherein the subscriber has a plurality of associated telephony devices including a first telephony device and a second telephony device, each of said plurality of associated telephony devices is contactable via a device-shared telephone dialling number, the first telephony device is capable of communicating with a telecommunications network, and the second telephony device is capable of communicating with a packet-switched network and further capable of communicating with a circuit-switched network, wherein the method comprises at a control system:

receiving an incoming call connection request associated with an incoming call directed to the device-shared telephone dialling number for the subscriber, the incoming call connection request having been routed to the control system on the basis of the device-shared telephone dialling number, initiating a first control phase, and in said first control phase:

transmitting a first outgoing call connection request over the telecommunications network to the first telephony device, and performing an operation to at least attempt to transmit a second outgoing call connection request over the packet-switched network to the second telephony device, in preference to transmitting an outgoing call connection request over the circuit-switched network to the second telephony device, if the operation to at least attempt to transmit the second outgoing call connection request is deemed to be unsuccessful, initiating a second control phase, and in said second control phase transmitting a third outgoing call connection request over the circuit-switched network to the second telephony device, receiving a call connection response from one of the first telephony device and the second telephony device, and connecting said incoming call to said one of said first telephony device and the second telephony device.

In accordance with a fifth aspect of the invention, there is provided a computer program product comprising a non-transitory computer-readable storage medium having computer readable instructions stored thereon, the computer readable instructions being executable by a computerized device to cause the computerized device to perform a method of providing a telecommunication service to a subscriber of a telecommunication system wherein the subscriber has a plurality of associated telecommunication devices including a first device and a second device, each of said plurality of associated telecommunication devices is contactable via a device-shared identification address, the first device is capable of communicating with a telecommunications network, and the second device is capable of communicating with a packet-switched network and further capable of communicating with a circuit-switched network, wherein the method comprises at a control system:

receiving an incoming telecommunication request associated with an incoming telecommunication request directed to the device-shared identification address for the subscriber, the incoming telecommunication request having been routed to the control system on the basis of the device-shared identification address, initiating a first control phase, and in said first control phase:

transmitting a first outgoing telecommunication request over the telecommunications network to the first device, and performing an operation to at least attempt to transmit a second outgoing telecommunication request over the packet-switched network to the second device, in preference to transmitting an outgoing telecommunication request over the circuit-switched network to the second device, and if the operation to at least attempt to transmit a second outgoing telecommunication request is deemed to be unsuccessful, initiating a second control phase, and in said second control phase transmitting a third outgoing telecommunication request over the circuit-switched network to the second device.

In accordance with a sixth aspect of the invention, there is provided computer program product comprising a non-transitory computer-readable storage medium having computer readable instructions stored thereon, the computer readable instructions being executable by a computerized device to cause the computerized device to perform a method of providing a telephony service to a subscriber of a telecommunication system, wherein the subscriber has a plurality of associated telephony devices including a first telephony device and a second telephony device, each of said plurality of associated telephony devices is contactable via a device-shared telephone dialling number, the first telephony device is capable of communicating with a telecommunications network, and the second telephony device is capable of communicating with a packet-switched network and further capable of communicating with a circuit-switched network, wherein the method comprises at a control system:

receiving an incoming call connection request associated with an incoming call directed to the device-shared telephone dialling number for the subscriber, the incoming call connection request having been routed to the control system on the basis of the device-shared telephone dialling number, initiating a first control phase, and in said first control phase:

transmitting a first outgoing call connection request over the telecommunications network to the first telephony device, and performing an operation to at least attempt to transmit a second outgoing call connection request over the packet-switched network to the second telephony device, in preference to transmitting an outgoing call connection request over the circuit-switched network to the second telephony device, if the operation to at least attempt to transmit the second outgoing call connection request is deemed to be unsuccessful, initiating a second control phase, and in said second control phase transmitting a third outgoing call connection request over the circuit-switched network to the second telephony device,
receiving a call connection response from one of the first telephony device and the second telephony device, and
connecting said incoming call to said one of said first telephony device and the second telephony device.

Further features and advantages of the invention will become apparent from the following description of preferred embodiments of the invention, given by way of example only, which is made with reference to the accompanying drawings.

DETAILED DESCRIPTION

Figure 1:
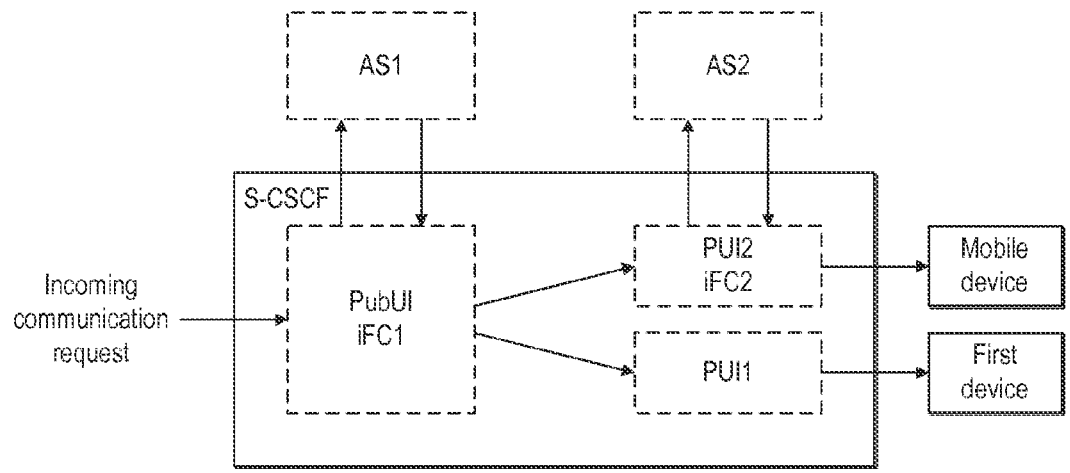
FIG. 1 depicts a system diagram of a first embodiment of a control system.

Embodiments described below relate to the conditional delivery of telecommunication data to multiple telecommunication devices associated to a subscriber of a telecommunications system.

In a first embodiment of the invention, there is provided a method of providing a telecommunication service to a subscriber of a telecommunication system wherein the subscriber has a plurality of associated telecommunication devices including a first device and a second device, each of said plurality of associated telecommunication devices is contactable via a device-shared identification address, the first device is capable of communicating with a telecommunications network, and the second device is capable of communicating with a packet-switched network and further capable of communicating with a circuit-switched network, wherein the method comprises at a control system:
receiving an incoming telecommunication request associated with an incoming telecommunication request directed to the device-shared identification address for the subscriber, the incoming telecommunication request having been routed to the control system on the basis of the device-shared identification address;
initiating a first control phase, and in said first control phase:
transmitting a first outgoing telecommunication request over the telecommunications network to the first device; and
performing an operation to at least attempt to transmit a second outgoing telecommunication request over the packet-switched network to the second device, in preference to transmitting an outgoing telecommunication request over the circuit-switched network to the second device; and
if the operation to at least attempt to transmit the second outgoing telecommunication request is deemed to be unsuccessful, initiating a second control phase, and in said second control phase transmitting a third outgoing telecommunication request over the circuit-switched network to the second device.

In some embodiments a conditional telecommunication service for a subscriber with multiple devices is provided. All of the multiple devices may be contactable via a shared identification address. Whilst some devices may have only one mode of contact, at least one of the devices in embodiments has both a packet-switched contact mode and a circuit-switched contact mode. An attempt to contact the second device is first made over a packet-switched network. If for example the second device is found to be non-contactable over the packet-switched network, then an attempt to contact the second device is made over a circuit-switched network. Hence, when there is an incoming telecommunication to the subscriber, embodiments allow all the subscriber's multiple devices to be contacted even though the second device may not be contactable over the packet-switched network, and nevertheless contact via the packet-switched network is attempted first.

The first device and second device may be telecommunication devices suitable for supporting one or more different types of telecommunication data. In an embodiment, the first device and second device may be telephony devices suitable for supporting voice calls. The first telephony device and/or the second telephony device may be multimedia devices that can support other types of telecommunication data in addition to the voice calls.

The first device may be a fixed-line device or a mobile device. The first device may be capable of communicating with a packet-switched network or a circuit-switched network. The first device may be capable of communicating with a packet-switched network using any suitable communication protocol.

The second device may be capable of communicating wirelessly with any suitable packet-switched telephone network. The second device may be configured to communicate wirelessly with the packet-switched telephone network using any suitable communication protocol. The second device may also be capable of communicating wirelessly with any suitable circuit-switched telephone network.

If the first device is contactable over a packet-switched device, then the first device and second device may be capable of communicating with the same packet-switched network. If the first device is contactable over a circuit-switched device, the first device and second device may be capable of communicating with the same circuit-switched network.

The packet-switched network for the first device and/or the second device may, for example, comprise an Internet Protocol (IP) network, a General Packet Radio Service (GPRS) network or a Long Term Evolution (LTE) network. The IP network may be accessed for example via a WiFi (IEEE 802.11) radio link.

The circuit-switched telephone network may, for example, comprise a Global System for Mobile Communication (GSM) network, a Universal Mobile Telecommunications Service (UMTS) network, a Code Division Multiple Access-One (CDMAOne) network or a Code Division Multiple Access-2000 (CDMA2000) network.

The communication protocols used for establishing communication over the packet-switched network may, for example, comprise Session Initiation Protocol (SIP), Real-time Transport Protocol (RTP), User Datagram Protocol (UDP), Transmission Control Protocol (TCP) or Internet Protocol (IP).

The device-shared identification address may be any information suitable for identifying a subscriber. The device-shared identification address may be a numeric, non-numeric or combination identity address. The identification address may depend on the type of telecommunication devices being used by the subscriber.

The control system may comprise one or more switching means to direct the telecommunication data to different subscriber devices and/or across different telecommunications networks.

The control system may transmit the first outgoing telecommunication request to the first device and performs the operation to at least attempt to transmit the second outgoing telecommunication request to the second device in parallel so that the devices can be contacted at substantially the same time (i.e. simultaneously) in the first control phase.

The control system may initially perform the operation to at least attempt to transmit the second outgoing telecommunication request to the second device over the packet-switched network. If, for whatever reason, the second device cannot be contacted over the packet-switched network, the control system then transmits a third outgoing telecommunication request to the second device over the circuit-switched network.

The control system may comprise a softswitch. A control system with a softswitch architecture may further comprise one or more session border controllers (SBCs).

The control system may alternatively be embodied as one or more nodes of an Internet Protocol Multimedia Subsystem (IMS) network.

In some embodiments, the control system comprises one or more nodes of an IMS network including a Serving-Call Session Control Function (S-CSCF) configured with a Public User Identity for the subscriber, a private user identity for the first device and a private user identity for the second device; and an Application Server (AS2) configured with a telecommunication service in association with the private user identity of the second device. The telecommunication service may be an unavailable call forwarding service.

In some embodiments, the control system comprises one or more nodes of an IMS network including a Serving-Call Session Control Function with initial Filter Criteria (iFC) configured for the subscriber; and an Application Server configured to fork telecommunication data to the first device and second device using Global Routing User Agent URIs (GR-UUs) assigned to each device.

In some embodiments, the control system comprises one or more nodes of an IMS network including a Serving-Call Session Control Function (S-CSCF); and an Application Server (AS) configured to fork telecommunication data to the first device and the second device using feature tags. The AS may fork telecommunication data to the first device using a reject-contact header with a feature tag associated with the second device and to the second device using an accept-contact header with a feature tag associated with the second device.

The method may further comprise identifying the second device.

If the control system has a softswitch architecture, the identity of the second device may be determined from information associated with the registration of the soft client of the second device. The information associated with the registration of the soft client may be a distinctive user-agent header, a private address of record which the softswitch regards as an alias of the subscriber's normal address of record or a distinctive contact header.

If the control system has an IMS architecture comprising a private user identity for the second device, then the identity of the second device may be determined from information associated with the registration of the second device on the private user identity.

If the control system has an IMS architecture comprising a GRUU assigned to the first device and a GRUU assigned to the second device, the identity of the second device may be determined from identifying information associated with the registration of the soft client of the second device. The information associated with the registration of the soft client may be a distinctive contact header. Alternatively, the identity of the second device may be determined when a GRUU is assigned to the second device.

The method may further comprises determining if the second outgoing telecommunication request has succeeded or failed in reaching the second device over the packet-switched network.

If the second device has been identified, then determining if the second outgoing telecommunication request has succeeded or failed in reaching the second device may comprise monitoring for a response to the second outgoing telecommunication request from the second device, for example within a predetermined time period.

If a response from the second device is detected then the second outgoing telecommunication request is deemed to have reached the second device. However, if no response from the second device is detected then the second outgoing telecommunication request is deemed to have failed.

If the second device has not been identified, then determining if the second outgoing telecommunication request has succeeded or failed in reaching the second device may comprise monitoring for a response with a flag (feature, marker, tag) that indicates the response came from the second device, for example within a predetermined time period.

If a response with the flag is detected then the second outgoing telecommunication request is deemed to have reached the second device. However, if no response with the flag is detected then the second outgoing telecommunication request is deemed to have failed.

As explained previously, if the second outgoing telecommunication request is found to have failed, then an attempt is made to make contact with the second device over the circuit-switched network. This is achieved by transmitting a third outgoing telecommunication request to the second device over the circuit-switched network.

Transmitting the third outgoing telecommunication request over the circuit-switched network to the second device may further comprise transmitting the third outgoing telecommunication request using an identification address that is unique to the second device.

Alternatively, transmitting the third outgoing telecommunication request over a circuit-switched network to the second device may be based on a location query being sent to the subscriber database.

The method may further comprise, in response to receiving the call connection response from one of the first device and the second device, cancelling the outgoing call connection request to the other of the first device and the second device. Hence, pending call connections to devices which have not been answered can be cancelled, thus stopping the unanswered telephony device from ringing unnecessarily and helping to free up network resources.

In a second embodiment of the invention, there is provided a method of providing a telephony service to a subscriber of a telecommunication system, wherein the subscriber has a plurality of associated telephony devices including a first telephony device and a second telephony device, each of said plurality of associated telephony devices is contactable via a device-shared telephone dialling number, the first telephony device is capable of communicating with a telecommunications network, and the second telephony device is capable of communicating with a packet-switched network and further capable of communicating with a circuit-switched network, wherein the method comprises at a control system:

- receiving an incoming call connection request associated with an incoming call directed to the device-shared telephone dialling number for the subscriber, the incoming call connection request having been routed to the control system on the basis of the device-shared telephone dialling number;
- initiating a first control phase, and in said first control phase:
  - transmitting a first outgoing call connection request over the telecommunications network to the first telephony device; and
  - performing an operation to at least attempt to transmit a second outgoing call connection request over the packet-switched network to the second telephony device, in preference to transmitting an outgoing call connection request over the circuit-switched network to the second telephony device;
- if the operation to at least attempt to transmit the second outgoing call connection request is deemed to be unsuccessful, initiating a second control phase, and in said second control phase transmitting a third outgoing call connection request over the circuit-switched network to the second telephony device;
- receiving a call connection response from one of the first telephony device and the second telephony device; and
- connecting said incoming call to said one of said first telephony device and the second telephony device.

The first telephony device and second telephony device may be any telephony device suitable for supporting voice communication. The first telephony device and/or the second telephony device may be multimedia devices that can support other telecommunication services. For example, the first telephony device and/or second telephony device may additionally support voice messaging, text messaging, multimedia messaging, email messaging, video, music, multimedia, facsimile and/or data applications. Hence, the "incoming call" for the telephony devices may comprise voice data, voice messaging data, text messaging data, multimedia messaging data, email messaging data, video data, music data, multimedia data, facsimile data, data applications and/or any other telecommunications data.

The Telecommunication Devices of the Subscriber

The subscribers of a telecommunications system each have a plurality of associated telecommunication devices. The telecommunication devices of each subscriber include a first device and a second device, which in this embodiment is a mobile device.

The first device and mobile device may be any telecommunication terminal suitable for supporting one or more telecommunication services such as voice, video, music, images, multimedia, facsimile, short messages using the Short Message Service (SMS), multimedia messages using the Multimedia Messaging Service (MMS), email messages, games, notifications, applications and/or data resources accessible from private or public networks such as the Internet. The first device and mobile device may be telephony devices suitable for supporting voice calls. The first telephony device and/or the mobile telephony device may be multimedia devices that can support other types of telecommunication data in addition to the voice calls.

The first device may be a fixed-line device or a mobile device. The first device may be capable of communicating with a packet-switched network or a circuit-switched network. The first device may communicate with a packet switched network using any suitable communication protocol.

As an example, the first device may be a fixed-line telephony device capable of communicating with an IP network using SIP. Alternatively, the first device may be a fixed-line telephony device capable of communicating with a Public Switched Telephone Network (PSTN).

The mobile device is capable of communicating wirelessly with a packet-switched network. The mobile device may communicate wirelessly with the packet-switched network using any suitable communication protocol.

There may be occasions when the mobile device is not contactable over the packet-switched network. For example, the mobile device may not be contactable if it has moved out of the packet-switched network region, if the registration of the mobile device has expired or the packet-switched network has failed. Thus, the mobile device is also configured so that it is capable of communicating wirelessly with a circuit-switched network. The circuit-switched network acts as a secondary or back-up network for the mobile device. This means the telecommunication data may still be delivered to the mobile device when the mobile device is not contactable over the packet-switched network.

As an example, the mobile device may be a mobile telephony device capable of communicating wirelessly with an IP network using SIP and with a GSM network. A mobile telephony device may comprise a soft client (a computer software program) to provide telephony services over a packet-switched network.

If the first device is contactable over a packet-switched device, then the first device and mobile device may be capable of communicating with the same packet-switched network. If the first device is contactable over a circuit-switched device, the first device and mobile device may be capable of communicating with the same circuit-switched network.

The packet-switched network for the first device and/or second device may, for example, comprise an Internet Protocol (IP) network, a General Packet Radio Service (GPRS) network, an Internet Protocol Multimedia Subsystem (IMS) network or a Long Term Evolution (LTE) network.

The circuit-switched telephone network may, for example, comprise a Global System for Mobile Communication (GSM) network, a Universal Mobile Telecommunications Service (UMTS) network, a Code Division Multiple Access- One (CDMAOne) network or a Code Division Multiple Access-2000 (CDMA2000) network.

The communication protocols used in the packet-switched network may, for example, comprise Session Initiation Protocol (SIP), Real-time Transport Protocol (RTP), User Datagram Protocol (UDP), Transmission Control Protocol (TCP) or Internet Protocol (IP).

Device-Shared Identification Address

The devices associated with the subscriber (including the first device and mobile device) are contactable via a device-shared identification address. Hence, a third party may contact all of the subscriber's devices using a single address.

The device-shared identification address may be any information suitable for identifying a subscriber. The device-shared identification address may be a numeric, non-numeric or combination identity address. The identification address may depend on the type of telecommunication devices being used by the subscriber. For example, if the telecommunication devices are telephony devices then the device-shared identification number may be a telephone number shared by the devices, such as 123456789.

Control System

The delivery of the incoming telecommunication data is controlled by a control system. The control system may be part of a Service Delivery Platform (SDP) which provides service delivery capabilities for the telecommunication services of the subscriber's devices.

An incoming telecommunication request is transmitted to the control system when a third party generates an incoming communication directed to the device-shared identification address for the subscriber. On receipt of the incoming telecommunication request, the control system transmits outgoing telecommunication requests to the first device and the mobile device. The control system transmits a first outgoing telecommunication request to the first device. The control system transmits a second outgoing telecommunication request to the mobile device. Since communication over the packet-switched network is preferred, the control system selectively transmits the second outgoing communication over the packet-switched network to the mobile device. If the second outgoing communication fails to reach the mobile device, the control system transmits a third outgoing communication over the circuit-switched network to the mobile device. On receipt of a connection response from the one of the first device or the mobile device, the control system then connects the incoming telecommunication to the first device or mobile device.

The control system interfaces with the telecommunications networks of the third party device and the subscriber's devices. So as to control the transfer of telecommunication data, the control system may be arranged at a junction point between the telecommunications networks of the third party device and the subscriber's devices.

The control system may transfer the telecommunication data to the first device and mobile device in parallel so that the devices are contacted at substantially the same time (simultaneously).

The control system may comprise one or more switching means to direct ("fork") the telecommunication data to different devices and over different telecommunications networks.

The control system may comprise a softswitch to control the forking processes. Softswitches are typically used in telephone networks to control the delivery of telephony data to telephone devices. The softswitch may comprise a media gateway and a call agent.

The control system with a softswitch architecture may further comprise a session border controller (SBC) to provide control at the border of different networks.

The control system may alternatively comprise or be embodied in an Internet Protocol Subsystem (IMS) network.

As depicted in FIG. 1, an embodiment of the IMS network may comprise a Serving-Call Session Control Function (S-CSCF) with a Public User Identity (PubUI) for the subscriber, a first initial Filter Criteria (iFC1) configured for the subscriber, a private user identity for the first device (PUI1) and a private user identity for the mobile device (PUI2). The IMS network may also comprise a first Application Server (AS1) arranged in association with the Public User Identity and the first initial Filter Criteria. To enhance the control processes, the IMS network further comprises a second initial Filter Criteria (iFC2) configured for the mobile device and arranged in association with the private user identity of the mobile device and a second Application Server (AS2) having an unavailable call forwarding service and arranged in association with the second initial Filter criteria and private user identity of the mobile device. The S-CSCF is responsible for the registration of the subscriber's devices and the forking of the telecommunication data to the devices. The Public User Identity is configured to receive an incoming telecommunication request from a third party. The incoming telecommunication request is processed by iFC1 to determine if it complies with the criteria for the subscriber. If the incoming telecommunication request complies, the S-CSCF invokes AS1 to allow the services provided by AS1 to be applied to the telecommunication request. If AS1 responds with an indication that the incoming telecommunication request is to proceed, the S-CSCF then forks a first outgoing telecommunication request to the first device via the private user identity for the first device. The S-CSCF also forks an outgoing telecommunication request to the private user identity for the mobile device. The outgoing telecommunication request for the mobile device is processed by iFC2 so as to determine if the outgoing communication complies with the criteria for the private user identity PUI2. If it complies, then AS2 is invoked to allow the services provided by AS2 to be applied to the telecommunication request. AS2 responds that the outgoing communication is to proceed to the mobile device as a second outgoing telecommunication request. The S-CSCF forwards the second outgoing communication to the mobile device over a packet-switched network. However, if AS2 determines that the mobile device cannot be contacted over the packet-switched network, AS2 uses an unavailable call forwarding service to issue a third outgoing telecommunication request to be routed via the circuit-switched network to the mobile device.

Figure 2:
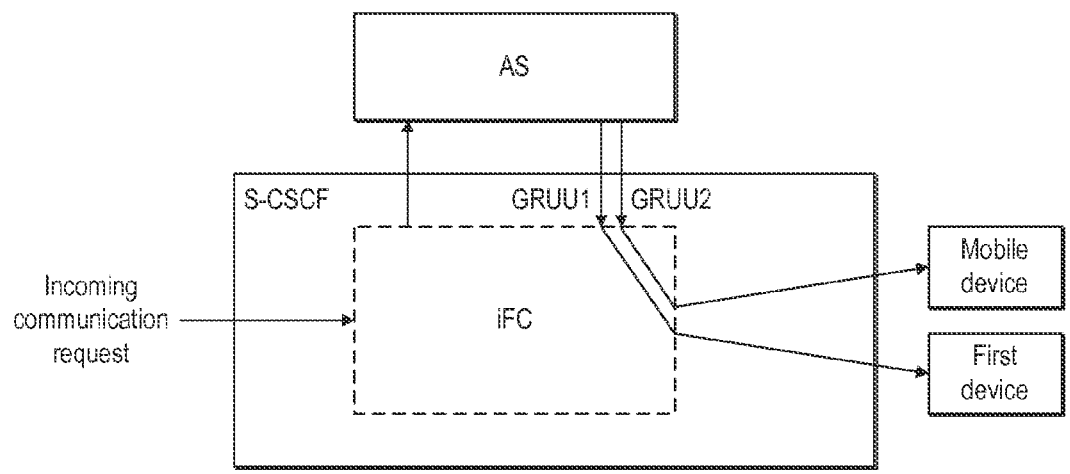
FIG. 2 depicts a system diagram of a second embodiment of a control system.

As depicted in FIG. 2, the IMS network may comprise a Serving-Call Session Control Function (S-CSCF) with initial Filter Criteria (iFC) and an Application Server (AS) arranged in association with the initial Filter Criteria. In this particular embodiment, the AS is responsible for forking the telecommunication data to the first device and mobile device. Different mechanisms defined in the SIP standards could be used by the AS to control the forking behaviour.

One such mechanism includes the use of Globally Routable User Agent URIs (GRUUs) to transfer outgoing telecommunication requests to the first device and mobile device. The AS learns about each registered SIP client from the S-CSCF using IMS-defined mechanisms such as $3^{rd}$ party REGISTERS. In particular, the AS uses the SIP extension defined in RFC 5628 to discover the GRUU assigned to each of the subscriber's registered devices (GRUU1 and GRUU2). Hence, when an incoming telecommunication is received by the S-CSCF, the AS sends a first outgoing telecommunication request to the first device using GRUU1 and a second outgoing telecommunication request across the packet-switched network to the mobile device using GRUU2 assigned to the mobile device. If the AS determines that the mobile device cannot be contacted over the packet-switched network then the AS sends a third outgoing telecommunication request across the circuit-switched network to the mobile device. The third outgoing telecommunication request may contain the telephone number of the mobile device or a temporary routing number which is obtained for example by means of a home location register (HLR) query.

Another mechanism used by the AS to control the forking behaviour is defined by standard RFC3841. Here the soft client of the mobile device forwards an RFC3840 feature tag to the control system during the registration process. Since the feature tag has been agreed between the AS and mobile device the AS can use the feature tag to identify the mobile device. The AS can also use the feature tag to control the forking of the telecommunication data by sending the S-CSCF an outgoing telecommunication request message containing a Reject-Contact header with the feature tag and an outgoing telecommunication request message containing an Accept-Contact header with the feature tag. In accordance with the Reject-Contact header instructions the S-CSCF to forwards the message with the Reject-Contact header to the first device (i.e. a device that did not register with the feature tag). In accordance with the Accept-Contact header instructions the S-CSCF forwards the message with the Accept-Contract head to the mobile device (i.e. a device that has registered with the feature tag).

The embodiments of the IMS networks may further comprise a Proxy-Call Session Control Function (P-CSCF). The P-CSCF provides a similar effect to the SBC in the softswitch architecture and controls the transfer of telecommunication at the network borders.

Registration of the Devices

Before the device-shared identification address telecommunication service is operational, the locations of the first device and the mobile device are registered. The first device and mobile device may register directly with the control system and/or with a subscriber database.

To allow for the transmission of telecommunication data over the packet-switched network the mobile device registers the identity and location of its soft client with the control system. The mobile device may be registered using a SIP REGISTER message.

To allow for the transmission of telecommunication data over the circuit-switched network the mobile device may register its location at a subscriber database, such as a home location register (HLR). The mobile device may register for a unique identification address that is specific to the mobile device. This particular identification address is different to the identification address shared by the multiple devices and, as explained below, it may be used to contact the mobile device across the circuit-switched network.

Identification of the Mobile Device

Prior to transmitting telecommunication requests to the first device and the mobile device, the conditional telecommunication service may identify the mobile device.

The control system may distinguish the mobile phone from other devices using some identifying information in the REGISTER message of the mobile device. The identifying information may be in the REGISTER message of the soft client of the mobile device.

For example, if the control system comprises a softswitch, the softswitch may identify the mobile device from a distinctive user-agent header, from a private address of record or from an indication in the contact header as explained below:

Although the content of a user-agent header is not standardised, it typically comprises information relating to the manufacturer, model, product name and/or operating software of a device. Therefore, the softswitch may identify the mobile device from the content of its user-agent header. If both the first device and the mobile device are SIP clients then the softswitch can only identify the SIP mobile device if the user agent header of the SIP mobile device is in some way distinct from the user agent header of the SIP first device.

Rather than register the soft client at a subscriber's address of record (AOR), the soft client of the mobile device may register at a "private" address of record during the registration process. The softswitch treats this private AOR as an alias of the user's normal address of record. For example, if the user's normal address of record is "123456789@example.com", the mobile device may register at a private AOR of "123456789-mobile@example.com" or 123456789(@example.com; mobile". The softswitch may adjust the signalling to other devices so that the private AOR is not revealed by substituting it with the user's normal address of record. Thus, any soft client may be used because the address of record is a standardised configuration option.

The contact header may include identifying information for the mobile phone. For example, the contact header may comprise a feature tag or similar. If the mobile device is a SIP mobile device then the feature tag may comply with SIP parameter RFC3840. The feature tag may be configured so that it is not rewritten, corrupted or deleted by a session border controller (SBC).

If the control system comprises an IMS network with private user identities for the first device and the mobile device, the IMS network may distinguish the mobile device from the first device from information associated with the registration of the mobile device on the private user identity for the mobile device. If the control system comprises an IMS network where the AS controls the forking of the telecommunication data, the IMS network may distinguish the mobile device from the first device using identifying information associated with the registration of the soft client of the mobile device. The identifying information may be, for example, a feature tag that has been previously agreed with the AS and is subsequently used in the controlling process. Alternatively, the identifying information may be a distinctive contact header sent during the registration process. If the IMS network uses GRUUs, then the mobile device may be identified from the GRUU assigned to the mobile device. This may be achieved using a manual configuration process, for example through a web portal. Alternatively, this may be achieved through a registration process where the AS learns the GRUU assigned to the soft client of the mobile device and, in some cases, a unique identification address that allows the mobile device to be contacted over a circuit-switched network. This could be achieved using a mechanism that bypasses the IMS network (for example, the soft client communicates directly with the AS using the HTTP protocol). Alternatively during this registration process, the subscriber may initiate contact with an interactive voice response unit (IVR) on the AS. The AS learns the GRUU for the mobile device from the SIP signalling. The AS IVR could also prompt the user to enter the unique identification address on which the mobile device is reachable via the circuit-switched network.

Determining if the Mobile Device is Contactable Over the Packet-Switched Network Having identified the mobile device, the control system may then determine whether or not the mobile device is contactable over the packet-switched network.

The control system may be able to determine that the mobile device is currently not contactable over the packet-switched network if no valid registration exists for the mobile device. However, the existence of a valid registration does not necessarily imply telecommunication with the mobile device is possible. For example, connectivity to the packet-switched network may have been lost before the registration has had time to expire. In this case the control system may send a second outgoing telecommunication request towards the mobile device. If the mobile device is contactable over the packet-switched network then the mobile device will issue a response to the second outgoing telecommunication request. However, if the mobile device is not contactable over the packet-switched network no response to the second outgoing telecommunication request will be issued. Alternatively, the mobile device or intermediate signalling device could identify some other condition which means that the telecommunication cannot be successfully established (for example, the packet-switched network which the mobile device is unable to sustain a voice call), in which case a failure response may be issued. Thus, the control system can determine whether or not telecommunication with the mobile phone is possible over the packet-switched network by monitoring for a response (or lack thereof) to the second outgoing telecommunication request, for example within a predetermined period of time.

If the control system determines that telecommunication with the mobile device is not possible over the packet-switched network, the control system will then attempt to transfer telecommunication to the mobile device over the circuit-switched network. This is achieved by transmitting a third outgoing telecommunication request over the circuit-switched network to the mobile device.

As indicated, embodiments include systems where the mobile device is identified before the control system can determine if the mobile device is contactable over the packet-switched network.

However, embodiments may also include systems where the success or failure of the second outgoing telecommunication device can be determined without knowing the identity of the mobile device in advance.

For example, if the mobile device is not identified, it can be determined if the second outgoing telecommunication device has succeeded or failed in reaching the mobile device over the packet-switched network by monitoring for a response message with an identifying feature that indicates the response message was generated by the mobile device.

This monitoring process may take place over a predetermined period of time.

If a response with the identifying feature is detected then the second outgoing telecommunication request is deemed to have been reached. However, if no response with the identifying feature is detected then the second outgoing telecommunication request is deemed to have failed.

These methods are suitable for use in a softswitch architecture or an IMS architecture.

Transmission of the Third Outgoing Telecommunication Request

The third outgoing telecommunication request may be transferred to the mobile device over the circuit-switched network using a unique identification address that is specific to the mobile device. Alternatively, if an identification address specific to the mobile device is not unique, the location of the mobile device may be queried from a subscriber database (e.g. a home location register) so as to obtain a temporary routing number to the mobile device. The third outgoing telecommunication request is then established wirelessly over the circuit-switched network using the temporary routing number.

The third outgoing telecommunication request may be forwarded to the mobile device using a SimRing mechanism or an unavailable call forwarding mechanism.

If the mobile device is a mobile telephony device then the unique identification address may be the telephone number of the mobile telephony device.

If the control system has an IMS architecture, the third outgoing telecommunication request may be transmitted using an Application Server with an unavailable call forwarding service.

Transfer of Telecommunications Data

When a subscriber selects one of the devices to receive the telecommunication data, the selected device sends a telecommunication connection response to the control system. The control system then connects the third party device and selected device to allow for the transfer of telecommunication data. For example, if the telecommunication data relates to a voice call from a third party telephony device and the subscriber selects to answer his mobile telephony device, then the control system connects the third party telephony device to the subscriber's mobile telephony device to allow the telephone call to proceed.

On receiving the telecommunication connection response from the selected device, the control system may cancel the outgoing telecommunication request to the non-selected device.

FIRST EXAMPLE

Figure 3:
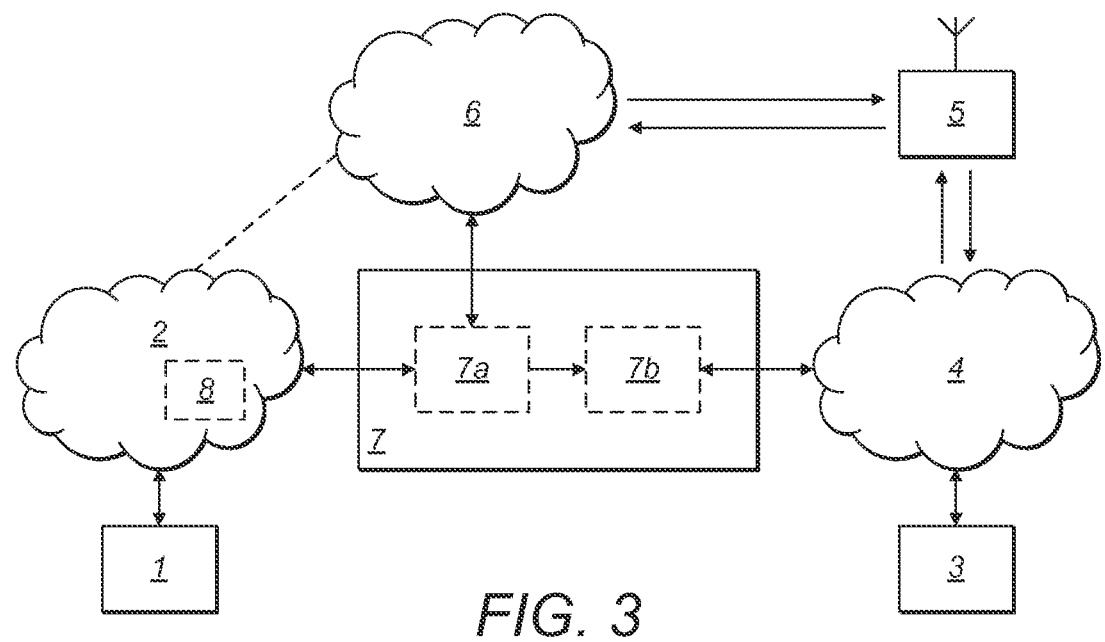
FIG. 3 depicts a system diagram of a first embodiment of a telecommunication system.

FIG. 3 shows a system diagram for a conditional telecommunication service according to a first embodiment. FIG. 3 shows a system that includes a caller device (1) which can communicate with a caller telephone network (2), a first telephony device (3) which can communicate with a packet-switched network (4) and mobile telephony device (5) which can communicate wirelessly with the packet-switched network (4) and a circuit-switched network (6). In this particular embodiment, the caller device is a fixed-line telephony device which can communicate with a PSTN. The first telephony device is a SIP compliant fixed-line telephony device which can communicate with an IP network. The mobile telephony device (5) is a multi-mode mobile telephony device which can communicate wirelessly with the IP network (using SIP) and a GSM network. The conditional telecommunication service is hosted by a call control system (7) located at a junction between the networks of the caller device and the subscriber's devices. Hence, the call control system interfaces with the PSTN, the IP network and the GSM network. The GSM network may also interface directly with the PSTN. Here the subscriber to conditional telecommunication service has two telephony devices—the SIP compliant fixed-line telephony device (3) and the multi-mode mobile telephony device (5) upon which he wishes to be contacted.

In this particular embodiment, the call control system comprises a softswitch (7a) to control the transfer of telephony data across the different networks. The call control system also comprises an SBC (7b) located between the softswitch (7a) and IP network (4).

The interfaces between the PSTN, IP network and GSM network may include one or more gateway. A media gateway (not shown) converts between the different protocols of media data passing between PSTN, IP network and GSM network such as packetized Voice over Internet Protocol (VoIP) data into Time-Division-Multiplexing (TDM) voice data and vice versa. A signalling gateway (not shown) converts between the different protocols of signalling information passing between PSTN, IP network and GSM network such as SIP, Signalling System 7 (SS7), Integrated Services Digital Network User Part (ISUP), American National Standards Institute (ANSI)—41, Mobile Application Part (MAP) formats, etc.

One or more media and/or signalling gateways interfacing between the PSTN, IP network and GSM network may be controlled by the softswitch, or their function may be combined into softswitch itself.

As well as conventionally providing the architecture for enabling conversion between both media data and signalling protocols via one or more media gateways and signalling gateways, the softswitch may provide call processing intelligence for use in the selection of processes that can be applied to a call, routing for a call within a network based on signaling and subscriber database information, the ability to transfer control of a call to another network element and management functions such as provisioning, fault detection and billing. For ease of explanation, it is hereafter assumed that soft switch is one network entity, although in practice it may comprise a distributed set of entities.

The PSTN (2) allows for the provision of telephony services to a number of fixed-line caller telephones although in this example only a single fixed-line telephone (1) is depicted. The PSTN contains an originating local telephone exchange switch (8) (such as a 'class 5' switch) which provides telephony services to and from, i.e. serves, the calling party telephone (1). In reality, local telephone exchange switch 8 will also serve other telephones (not shown) located in PSTN.

The IP network and GSM network allows for the provision of telephony services to a number of subscriber telephony devices, although in this example only a single SIP compliant fixed-line telephony device (3) and multi-mode mobile telephony device (5) is depicted.

The fixed-line telephony device (3) and multi-mode mobile telephony device (5) are contactable via a common telephone number 123456789.

Figure 4:
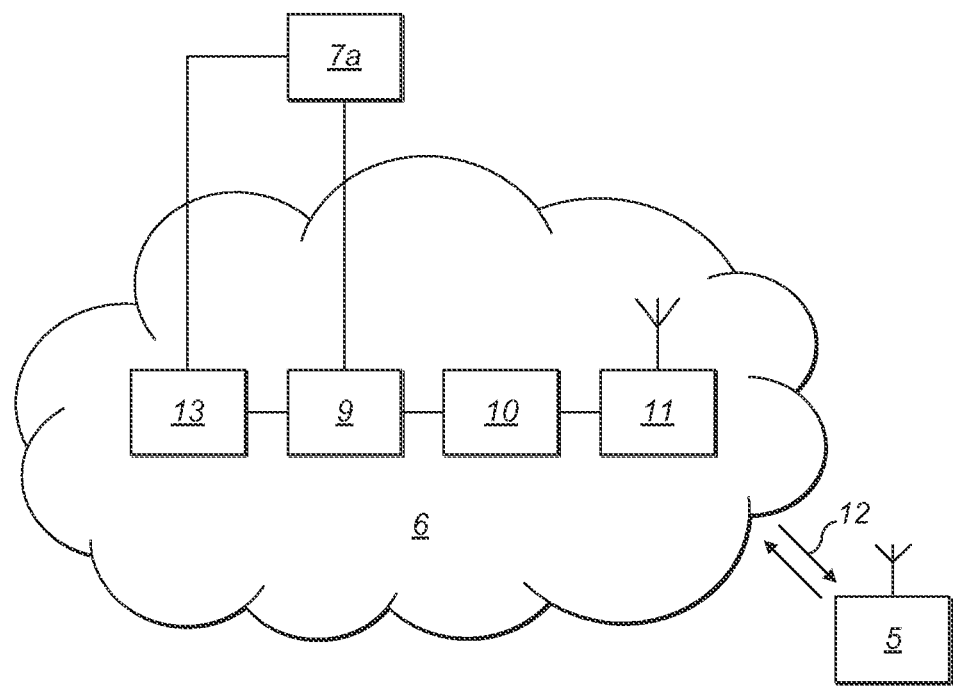
FIG. 4 depicts a system diagram of the GSM network for the telecommunication system of FIG. 3.

In the embodiment depicted in FIG. 4, the GSM network (6) comprises a mobile switching centre (MSC) (9) connected via a communications link to a base station controller (BSC) (10). BSC controls a base transceiver station (BTS) (11) located remote from, and connected by, a further communications link to BSC. BTS transmits radio signals to, and receives radio signals from the multi-mode mobile telephony device (5) via a radio interface (12). The multi-mode mobile telephony device (5) is located in an area (commonly known as a 'cell') served by BTS. In reality, a number of BSCs and BTSs would be dispersed geographically across an area served by MSC and multiple mobile telephones could communicate via BTS.

In the embodiment of FIG. 4, the MSC is depicted as a serving MSC as it provides a telephony service to a number of mobile telephones including the multi-mode mobile telephony device (5). Serving MSC is also connected via communications links to other MSCs (not shown) in the GSM network. In this particular embodiment, the GSM network is also provided with a home location register (HLR) (13).

Embodiments may be implemented using the various entities depicted in FIGS. 3 and 4. In this embodiment, calls to the subscriber's device-shared telephone dialling number are routed via the PSTN network to a call control system at which the main call processing and control functions are carried out.

Routing calls to the call control system may include assigning one or a block of telephone dialling numbers directly to the call control system (from which the subscriber's device-shared telephone dialling number is allocated), or using Number Portability methods (such as LNP) which allow individual telephone dialling numbers to be moved from one local telephone exchange switch to another local telephone exchange switch.

When a routing call is received by the call control system, the call control system invokes procedures which result in the ringing of both of the subscriber devices, for example simultaneously.

The call control system (7) sends an INVITE message (first outgoing telecommunication request) over the IP network to the SIP compliant fixed-line telephony device (3) using SIP procedures. The SIP compliant fixed-line telephony device (3) starts ringing when it receives the INVITE message.

The call control system also sends an INVITE message (second outgoing telecommunication request) over the IP network to the multi-mode mobile telephony device (5) using SIP procedures. If the multi-mode mobile telephony device (5) is reachable over the IP network then it will start ringing when it receives the INVITE message. However, the multi-mode mobile telephony device will not receive the INVITE message, and thereby remain silent, if it is not reachable over the IP network.

If the INVITE message fails to reach the multi-mode mobile telephony device, then the call control system attempts to ring the multi-mode mobile telephony device over the GSM network. To do this, it takes on the role of the subscriber's Gateway MSC (also known as a Home MSC or Originating MSC) and assumes control of the call. The control system queries the HLR (13) for the location of the subscriber's telephone using the subscriber's device-shared telephone dialling number. The response typically contains a temporary routing number, for example a Mobile Station Routing Number (MSRN), which is a routable network address up to 15 digits in length to route call establishment requests to the subscriber's current Serving MSC. The MSRN is allocated by the Serving MSC long enough for the call to be routed and then immediately released so that it may be reused. The control system establishes a call to the temporary routing number, resulting in the ringing of the subscriber's mobile telephony device.

Figure 5:
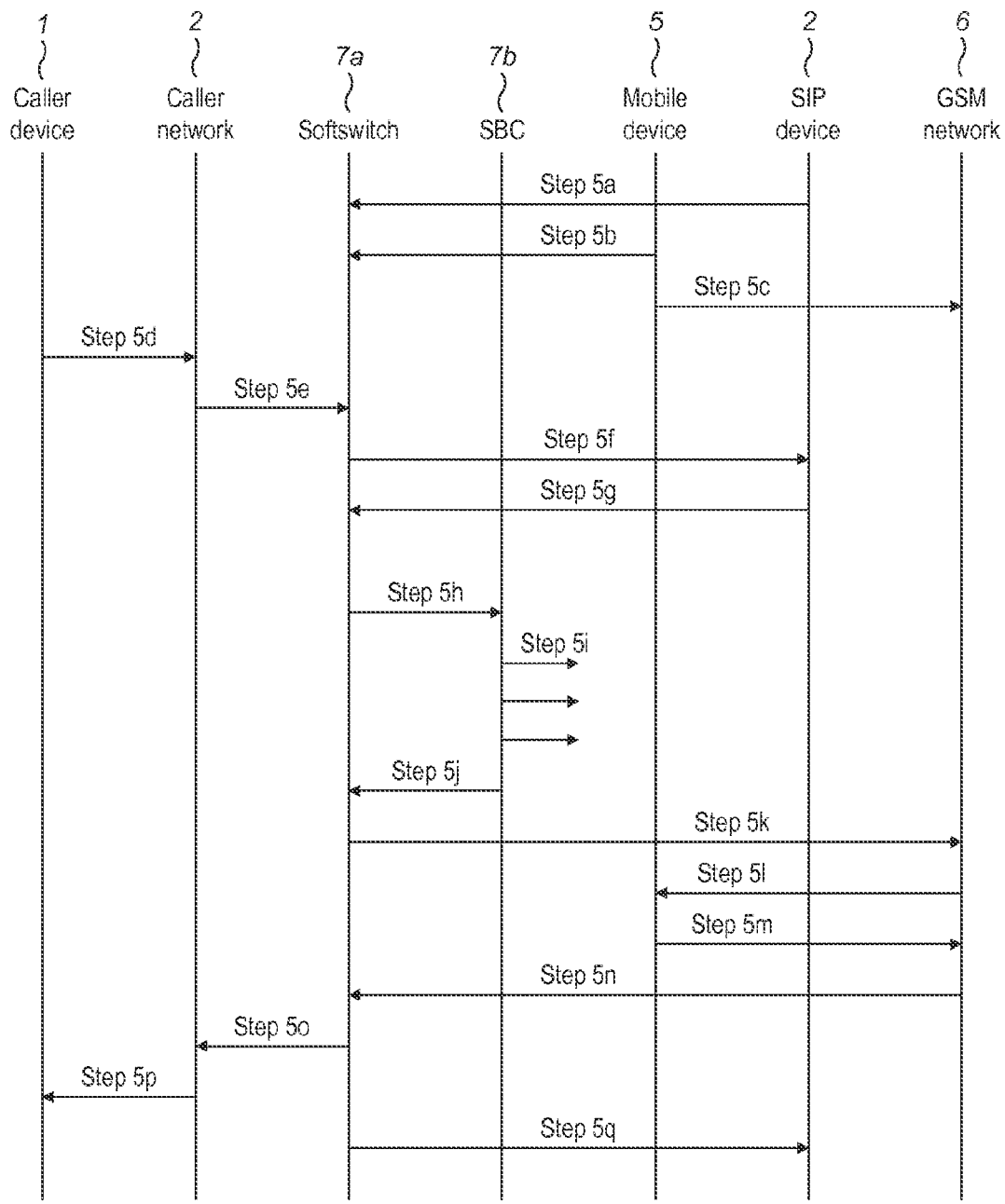
FIG. 5 is a flow diagram for the conditional delivery of telecommunication data in the telecommunication system of FIG. 3.

FIG. 5 is a flow diagram for the conditional telecommunication service according to the first embodiment. In this embodiment, a softswitch carries out the main call processing and control functions.

Before the device-shared telephone dialling service is operational, the location of SIP compliant fixed-line telephone device (3) is registered with the softswitch (STEP 5*a*), the location of the multi-mode mobile telephony device (5) is registered with both the softswitch and the GSM network (STEPS 5*b* & 5*c*).

The SIP compliant fixed-line telephony device (3) registers its current location in IP network with softswitch (7*a*) so that softswitch knows how to direct incoming calls to SIP device. This registration process may be carried out using SIP Register functionality where a SIP Register message is sent from SIP device to softswitch containing data identifying the device and details of how it can be contacted, e.g. an IP address. Registration may be carried out initially and then at periodic intervals subsequently. Softswitch is then able to use the register association (commonly referred to as a 'binding') to address SIP messages to SIP phone. Alternatively, the SIP device may register its location with a SIP Register network entity or SIP proxy server (not shown) responsible for processing registration of devices which can then be contacted by softswitch to ascertain the location of SIP phone in IP network.

Likewise, the soft client of the multi-mode mobile telephony device (5) registers its current location with the softswitch so that the softswitch knows how to direct incoming calls to the mobile device over the IP network. The registration process may be carried out as described above with respect to the SIP device.

When mobile device (5) enters a cell served by serving MSC (9) it registers its current location with serving MSC. The serving MSC will then update an appropriate visitor location register (VLR) (not shown) which may be remote from or may be incorporated into serving MSC. The serving MSC will then notify the HLR 13 of the location of mobile device and notify the MSC/VLR serving the cell where mobile device was previously located and that mobile device is no longer there (although a VLR may be shared across several MSCs so such a location update may not need to be registered).

Use of the device-shared telephone dialling service begins when a calling party wishes to make a call via their calling party telephone (1) to a subscriber to the device-shared telephone dialling service.

The calling party dials the device-shared telephone dialling number for the subscriber which causes an initial call connection request to be transmitted to originating local telephone exchange switch 8 which serves calling party telephone, as shown in STEP 5d. Originating local telephone exchange switch has been configured to generate a first incoming call connection request for a call directed to the subscriber's telephone dialling number, which is transmitted to the softswitch in STEP 5e. This can be seen as local telephone exchange switch 8 forwarding on the initial call connection request of STEP 5d in the form of the first incoming call connection request of STEP 5e to the softswitch.

The softswitch processes the first incoming call connection request of STEP 5e and identifies that the request relates to an incoming call to a device-shared telephone dialling services subscriber. The softswitch assumes control of the call, initiates a first control phase, and proceeds to create call legs to each of the telephony devices of the subscriber, in this case the mobile device and the SIP device.

A first outgoing call connection request is sent to the SIP device in STEP 5f in the form of a SIP Invite message containing the contact information for the SIP device. The SIP device will then begin to ring and will typically respond by sending a SIP 180 Ringing message back to the softswitch—see STEP 5g.

A second outgoing call connection request is sent to the mobile device in STEPS 5h and 5i in the form of a SIP Invite message containing the contact information for the mobile device.

However, since IP connectivity has been lost, the second outgoing call connection request cannot reach the mobile device. After multiple attempts over a predetermined period of time, the SBC sends a 408 Request Timeout message to the softswitch indicating that the second outgoing call connection request has failed (STEP 5j).

The softswitch then moves to a second control phase. Before a third call connection request can be sent to mobile device, the location of mobile phone is determined. This is carried out by the softswitch transmitting a location query containing the device-shared telephone dialling number for the subscriber to the HLR. The HLR then requests a Mobile Station Routing Number (MSRN) from the serving MSC. The serving MSC allocates a MSRN for the call and responds to the HLR accordingly. The HLR then forwards the allocated MSRN to the softswitch.

The softswitch transmits a third outgoing call connection request to the mobile device via a serving MSC of the GSM network in STEP 5k, for example in the form of an Initial Address Message (IAM) as per the ISUP standard. The serving MSC sets up a call to mobile device in STEP 5l, which starts to ring accordingly.

Both of the subscriber's telephony devices are now ringing, and in this case the subscriber answers the mobile device which causes an answer message to be transmitted from mobile device to serving MSC in STEP 5m. The serving MSC informs the softswitch that the mobile phone has been answered by transmitting a call connection response in STEP 5n, for example in the form of an Answer Message (ANM) as per the ISUP standard. The softswitch forwards the ANM message to calling party telephone via originating local telephone exchange switch in STEP 5o and 5p.

A call is now connected between calling party telephone and the mobile device and media data (for example voice data) may flow between the two (the call is connected).

Since the SIP device was not answered by the subscriber, the softswitch cancels the call connection request to it, for example by transmitting a SIP Cancel message to SIP device in STEP 5q. The SIP device stops ringing when it receives the Cancel message.

SECOND EXAMPLE

Figure 6:
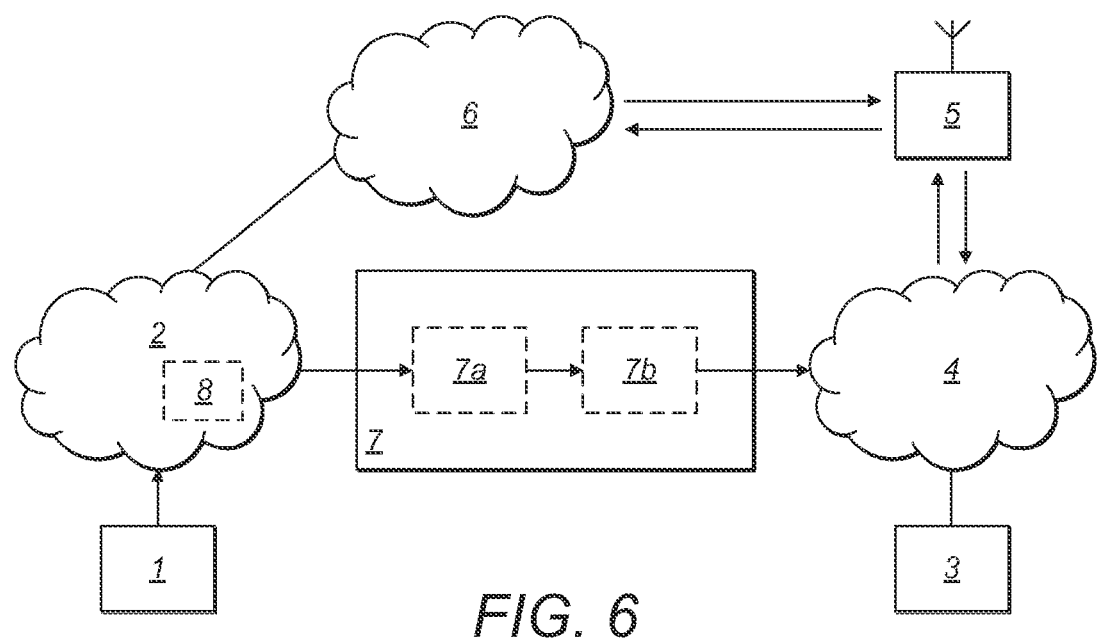
FIG. 6 depicts a system diagram of a second embodiment of a telecommunication system.

FIG. 6 shows a system diagram for a conditional telecommunication service according to a second embodiment. FIG. 6 shows the system has several components common to FIG. 3, a caller device (1) (a fixed-line telephony device) which can communicate with a caller telephone network (2) (PSTN), a first telephony device (3) (a SIP compliant fixed-line telephony) which can communicate with a packet-switched network (4) (an IP network) and mobile telephony device (5) (multi-mode mobile telephony device) which can communicate wirelessly with the packet-switched network (4) (IP network) and a circuit-switched network (6) (GSM network). The conditional telecommunication service is hosted by a call control system (7) located at a junction between the networks of the caller device and the subscriber's devices. The call control system comprises a softswitch (7a) and an SBC (7b). The PSTN contains an originating local telephone exchange switch (8) (such as a 'class 5' switch)

The fixed-line telephony device (3) and multi-mode mobile telephony device (5) are contactable by the caller phone via a common telephone number; e.g. 123456789.

In this embodiment, when the softswitch receives the incoming telecommunication request, the softswitch initiates a first control phase and sends an INVITE message (first outgoing telecommunication request) over the IP network to the SIP device using SIP procedures. The SIP device starts ringing when it receives the INVITE message.

The softswitch also sends an INVITE message (second outgoing telecommunication request) over the IP network to the mobile device using SIP procedures. If the mobile device is reachable over the IP network then the mobile device will start ringing when it receives the INVITE message. However, if the mobile device is not reachable over the IP network then the mobile device will not receive the INVITE message and remain silent.

If the INVITE message fails to reach the mobile device, then the softswitch moves to a second control phase and attempts to ring the mobile device over the GSM network. To do this, the softswitch uses SimRing procedures and rings the mobile device using a unique telephone number specific to the mobile device; 078112233.

Figure 7:
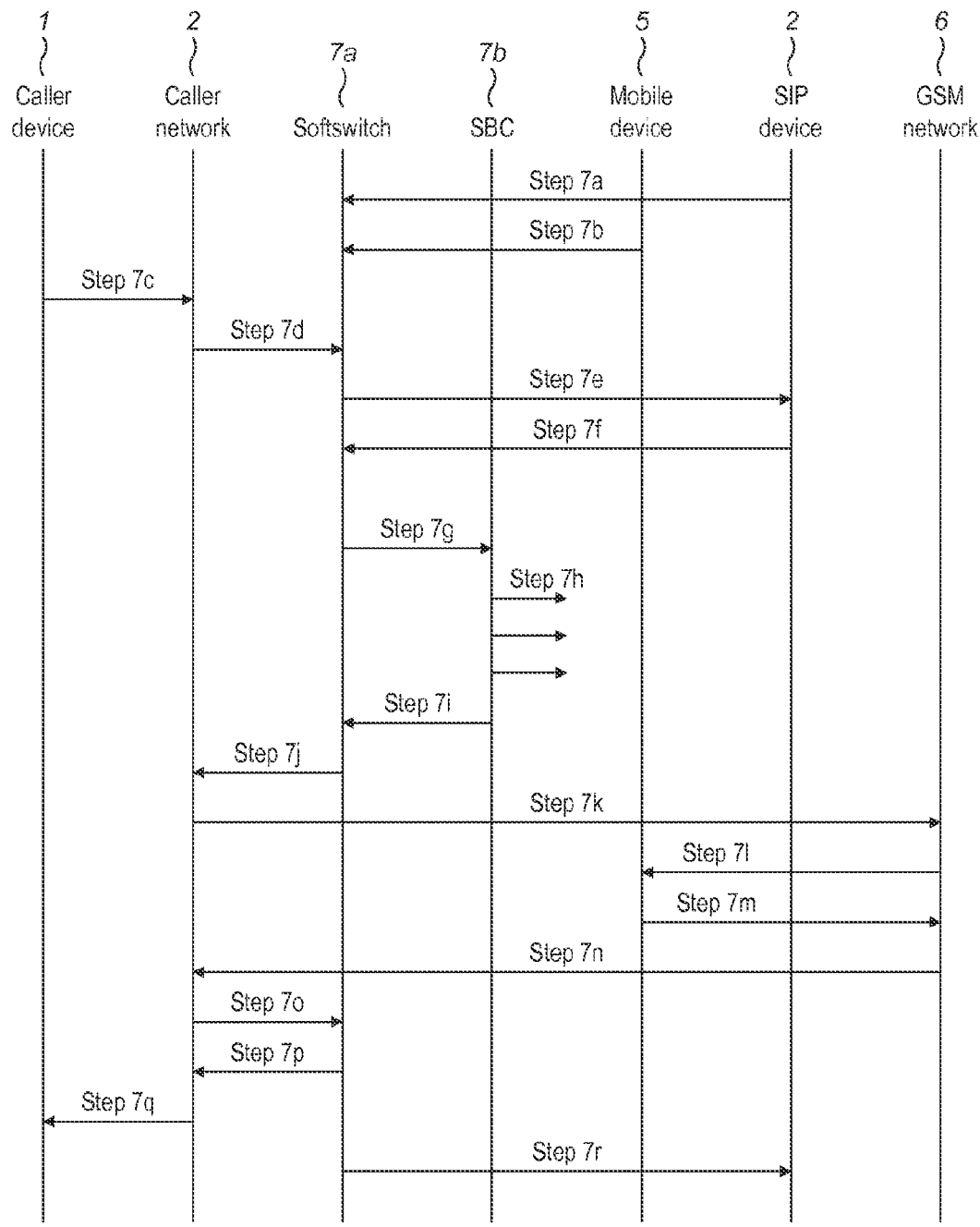
FIG. 7 depicts a flow diagram for the conditional delivery of telecommunication data in the telecommunication system of FIG. 6.

FIG. 7 is a flow diagram for the conditional telecommunication service according to the second embodiment. In this embodiment, the softswitch carries out the main call processing and control functions.

Before the device-shared telephone dialling service is operational, the location of SIP device and the mobile device is registered with the softswitch (STEPS 7a and 7b).

The SIP device and mobile device register their current location in the IP network with softswitch so that the softswitch knows how to direct incoming calls to these devices over the IP network. The registration process may follow standard SIP registration procedures.

The mobile device also registers with the GSM network. The softswitch maintains a record of the mobile device telephone number (which it receives e.g. through configuration) so that it knows how to direct incoming calls to the mobile device over the GSM network should the mobile device be unreachable over the IP network.

Use of the device-shared telephone dialling service begins when a calling party wishes to make a call via their calling party telephone to a subscriber to the device-shared telephone dialling service.

The calling party dials the device-shared telephone dialling number for the subscriber which causes an initial call connection request to be transmitted to originating local telephone exchange switch 8 which serves calling party telephone, as shown in STEP 7c. Originating local telephone exchange switch has been configured to generate a first incoming call connection request for a call directed to the subscriber's telephone dialling number, which is transmitted to softswitch in STEP 7d. This can be seen as local telephone exchange switch 8 forwarding on the initial call connection request of STEP 7c in the form of the first incoming call connection request of STEP 7d to softswitch.

The softswitch processes the first incoming call connection request of STEP 7d and identifies that the request relates to an incoming call to a device-shared telephone dialling services subscriber. The softswitch assumes control of the call, initiates a first control phase and proceeds to create call legs to each of the telephony devices of the subscriber, in this case the mobile device and the SIP device.

A first outgoing call connection request is sent to the SIP device in STEP 7e in the form of a SIP Invite message containing the contact information for the SIP device. The SIP device will then begin to ring and will typically respond by sending a SIP 180 Ringing message back to the softswitch— See STEP 7f.

A second outgoing call connection request is sent to the mobile device in STEPS 7g and 7h in the form of a SIP Invite message containing the contact information for the mobile device.

However, since IP connectivity has been lost, the second outgoing call connection request cannot reach the mobile device. After multiple attempts over a predetermined period of time, the SBC sends a 408 Request Timeout message to the softswitch indicating that the second outgoing call connection request has failed (STEP 7i).

The softswitch then moves to a second control phase and transmits a third outgoing call connection request to the mobile device via the PSTN and GSM networks in STEPS 7j, 7k, 7l using a SimRing mechanism and unique identification number 078112233. When the mobile device receives the request it starts to ring accordingly.

Both of the subscriber's telephony devices are now ringing, and in this case the subscriber answers the mobile device which causes an answer message to be transmitted from mobile device to the GSM network in STEP 7m. The GSM network informs the softswitch that the mobile phone has been answered by transmitting a call connection response in STEP 7n, for example in the form of an Answer Message (ANM) as per the ISUP standard. The softswitch forwards the ANM message to calling party telephone via originating local telephone exchange switch in STEPS 7o, 7p and 7q.

A call is now connected between calling party telephone and the mobile device and media data (for example voice data) may flow between the two (the call is connected).

Since the SIP device was not answered by the subscriber, the softswitch cancels the call connection request to it, for example by transmitting a SIP Cancel message to SIP device in STEP 7r. The SIP device stops ringing when it receives the Cancel message.

THIRD EXAMPLE

Figure 8:
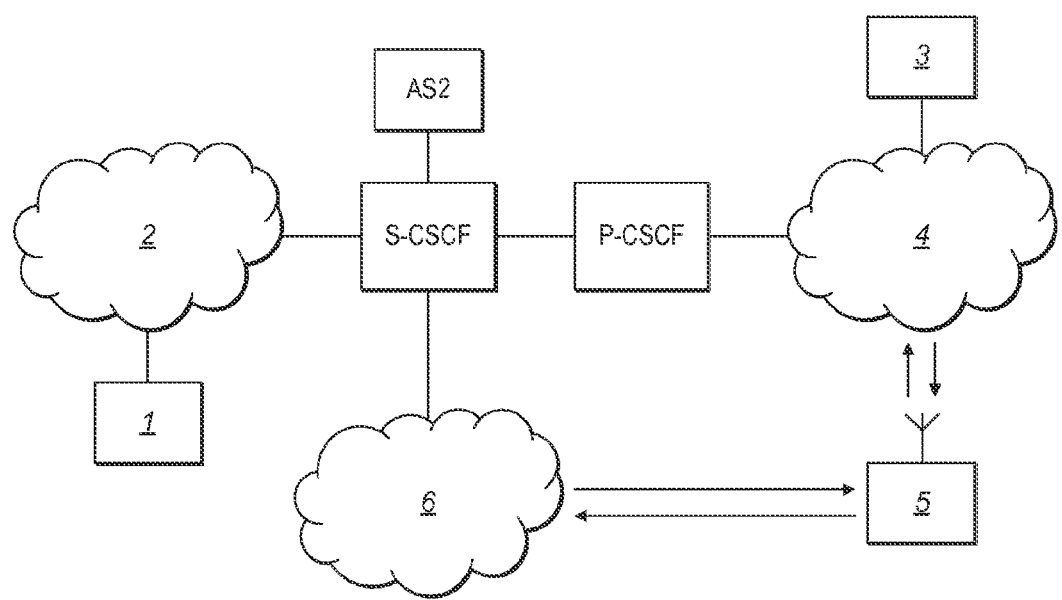
FIG. 8 depicts a system diagram of a third embodiment of a telecommunication system.

FIG. 8 shows a system diagram for a conditional telecommunication service according to a third embodiment. FIG. 8 shows the system has several components common to FIGS. 3 and 6 such as a caller device (1) (a fixed-line telephony device) which can communicate with a caller telephone network (2) (PSTN), a first telephony device (3) (a SIP compliant fixed-line telephony) which can communicate with a packet-switched network (4) (an IP network) and mobile telephony device (5) (multi-mode mobile telephony device) which can communicate wirelessly with the packet-switched network (4) (IP network) and a circuit-switched network (6) (GSM).

As with the previous embodiments, the conditional telecommunication service is hosted by a call control system located at a junction between the networks of the caller device and the subscriber's devices. However, in this embodiment, the call control system comprises an IMS network.

As depicted in FIG. 1, the IMS network comprises a Serving-Call Session Control Function (S-CSCF) having a Public User Identity (PubUI) with a first initial Filter Criteria (iFC1) configured for the subscriber, a private user identity for the first device (PUI1), a private user identity for the mobile device (PUI2) and a second initial Filter Criteria (iFC2) configured for the mobile device and arranged in association with the private user identity of the mobile device, The IMS network also comprises a first Application Server (AS1) arranged in association with the Public User Identity and a second Application Server (AS2) having an unavailable call forwarding service and arranged in association with the second initial Filter criteria and private user identity of the mobile device.

The IMS network further comprises a P-CSCF arranged between the S-CSCF and the IP network.

The IMS network may comprise other standard IMS components. One or more component may be located in the caller telephone network (2)

Figure 9:
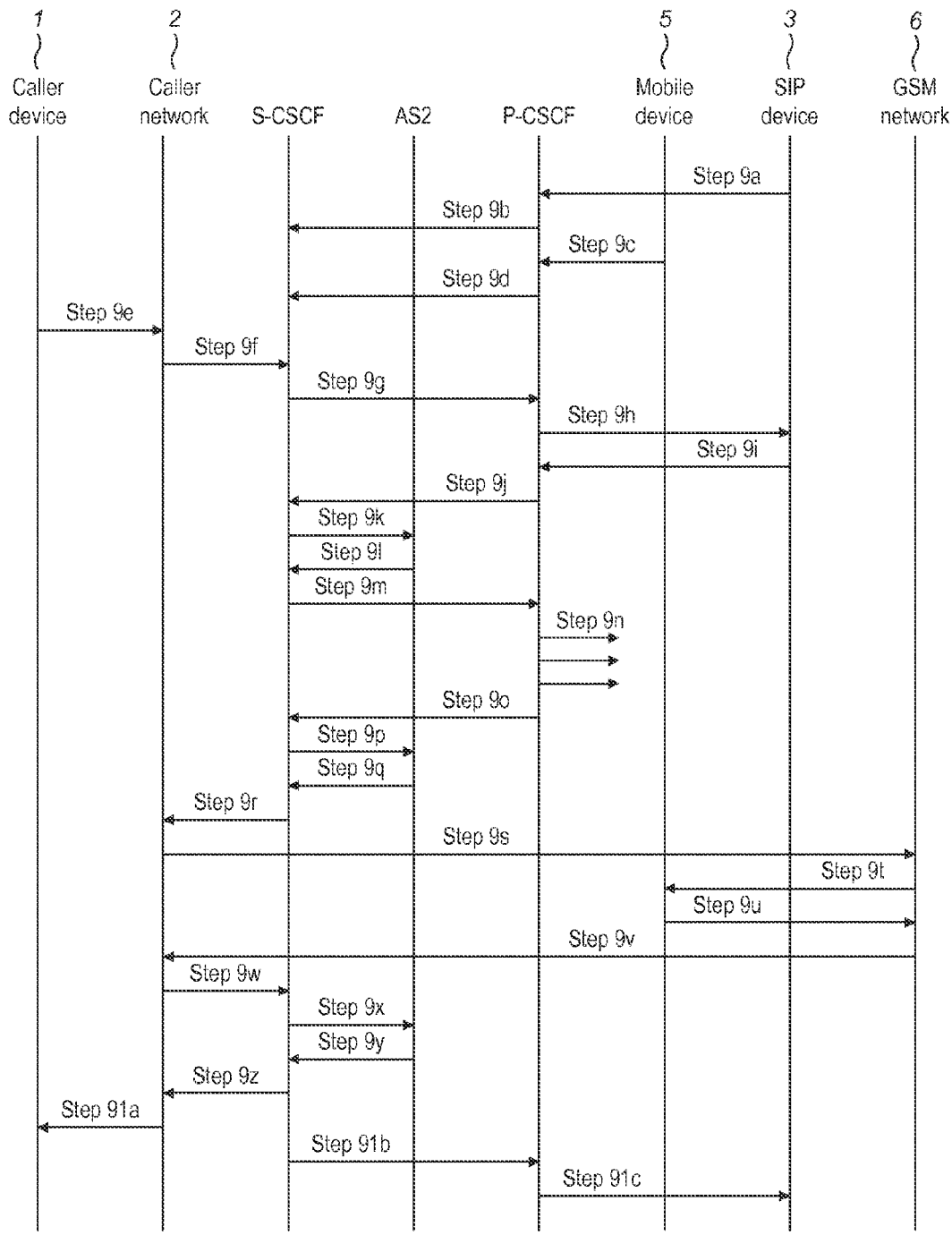
FIG. 9 depicts a flow diagram for the conditional delivery of telecommunication data in the telecommunication system of FIG. 8.

FIG. 9 depicts a flow diagram for the conditional telecommunication service according to the third embodiment. In this embodiment the second Application Server carries out the main call process and control functions.

Before the device-shared telephone dialling service is operational, the location of SIP device and the mobile device is registered with the IMS network. In STEPS 9a and 9b, the SIP device registers with the Private User Identity associated with the SIP device (PUI1). In STEPS 9c and 9d, the mobile device registers with the Private User Identity associated with the mobile device (PUI2).

The SIP device and mobile device register their current location in the IP network with respective Private User Identities so that it is known how to direct incoming calls to these devices over the IP network.

The mobile device also registers with the GSM network so that it is known how to direct incoming calls to the mobile device over the GSM network should the mobile device be unreachable over the IP network.

Use of the device-shared telephone dialling service begins when a calling party wishes to make a call via their calling party telephone to a subscriber to the device-shared telephone dialling service.

The calling party dials the device-shared telephone dialling number for the subscriber which causes an initial call connection request to be transmitted to the calling party network as shown in STEP 9e. The calling party network is configured to generate a first incoming call connection request for a call directed to the subscriber's telephone dialling number, which is transmitted to S-CSCF in STEP 9f.

On receiving the incoming call connection request, the S-CSCF first invokes the first iFC associated with the Public User Identity.

The S-CSCF initiates a first control phase. The contact details of the Private User Identity of the SIP device are retrieved so that a first outgoing telecommunication request in the form of a SIP Invite message can be forward to the SIP device as shown in STEPS 9g and 9h. The SIP devices starts ringing when it receives the request and typically responds by sending a SIP 180 Ringing message back to the S-CSCF—see STEP 9i and 9j. The S-CSCF then goes on to invoke the second iFC associated with the Private User Identity of the mobile device which results in a second call connection request in the form of a SIP Invite message being sent to the second Application Server (AS2) in STEP 9k.

The second Application Server signals to the S-CSCF that the call connection request should continue in the form of a SIP Invite message to the S-CSCF—see STEP 9l. The contact details of the Private User Identity of the mobile device are retrieved so that the S-CSCF can forward the second outgoing call connection request to the mobile device in STEPS 9m-9n in the form of a SIP Invite message.

However, since IP connectivity has been lost, the second outgoing call connection request cannot reach the mobile device. After multiple attempts over a predetermined period of time, the P-CSCF sends a 408 Request Timeout message to the second Application Server, via the S-CSCF, indicating that the second outgoing call connection request has failed (STEPS 9o and 9p).

When the second Application Server determines that the mobile device is uncontactable over the IP network it moves to a second control phase and routes a third outgoing call connection request to the mobile device via the S-CSCF and the GSM network. The second Application Server transmits the third outgoing call connection request over the GSM network using the unavailable call forwarding service—see STEPS 9q to 9t. The mobile device starts ringing when it receives the request.

Both of the subscriber's telephony devices are now ringing, and in this case the subscriber answers the mobile device which causes an answer message to be transmitted from mobile device to the GSM network in STEP 9u. The mobile device indicates that it has been answered by transmitting a call connection response in STEP 9u in the form of an Answer Message. The Answer Message propagates back until the S-CSCF receives a 200 OK message—see STEPS 9v to 9y (for example in the form of an Answer Message (ANM) as per the ISUP standard). The softswitch forwards the ANM message to the calling party telephone in STEPS 9z and 91a.

A call is now connected between calling party telephone and the mobile device and media data (for example voice data) may flow between the two (the call is connected).

Since the SIP device was not answered by the subscriber, the S-CSCF cancels the call connection request to it, for example by transmitting a SIP Cancel message to SIP device in STEPS 91b and 91c. The SIP device stops ringing when it receives the Cancel message.

FOURTH EXAMPLE

Figure 10:
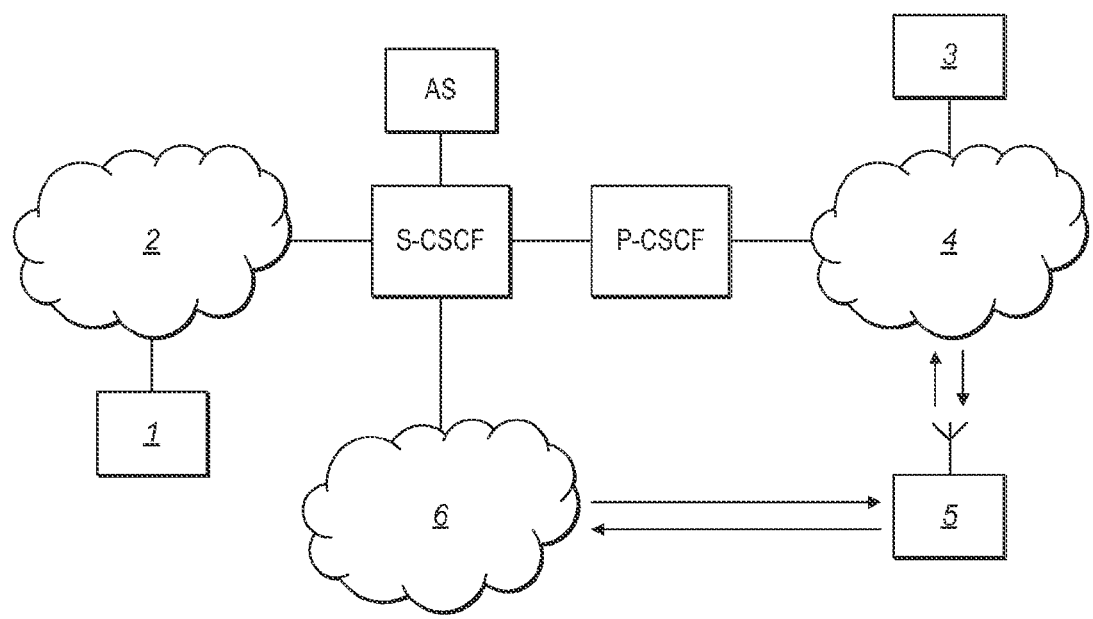
FIG. 10 depicts a system diagram of a fourth embodiment of a telecommunication system.

FIG. 10 shows a system diagram for a conditional telecommunication service according to a fourth embodiment. FIG. 10 shows the system has several components common to FIGS. 3 and 6 such as a caller device (1) (a fixed-line telephony device) which can communicate with a caller telephone network (2) (PSTN), a first telephony device (3) (a SIP compliant fixed-line telephony) which can communicate with a packet-switched network (4) (an IP network) and mobile telephony device (5) (multi-mode mobile telephony device) which can communicate wirelessly with the packet-switched network (4) (IP network) and a circuit-switched network (6) (GSM).

The conditional telecommunication service is hosted by a call control system located at a junction between the networks of the caller device and the subscriber's devices. In this embodiment, the call control system comprises an IMS network as depicted in FIG. 2.

The IMS network comprises a Serving-Call Session Control Function (S-CSCF) with initial Filter Criteria (iFC) and an Application Server (AS) having a Conditional SimRing service and arranged in association with the initial Filter Criteria. In this particular embodiment, the AS is responsible for forking the telecommunication data to the first device and mobile device. The AS uses GRUUs to transfer telecommunication requests to the first device and mobile device. The AS transfers a first outgoing telecommunication request to the first device using a GRUU assigned to the first device (GRUU1) and transfers a second outgoing telecommunication request to the mobile device using a GRUU assigned to the mobile device (GRUU2).

The IMS network further comprises a Proxy-Call Session Control Function (P-CSCF) arranged between the S-CSCF and the IP network. One or more components of the IMS network may be located in the caller network.

Figure 11:
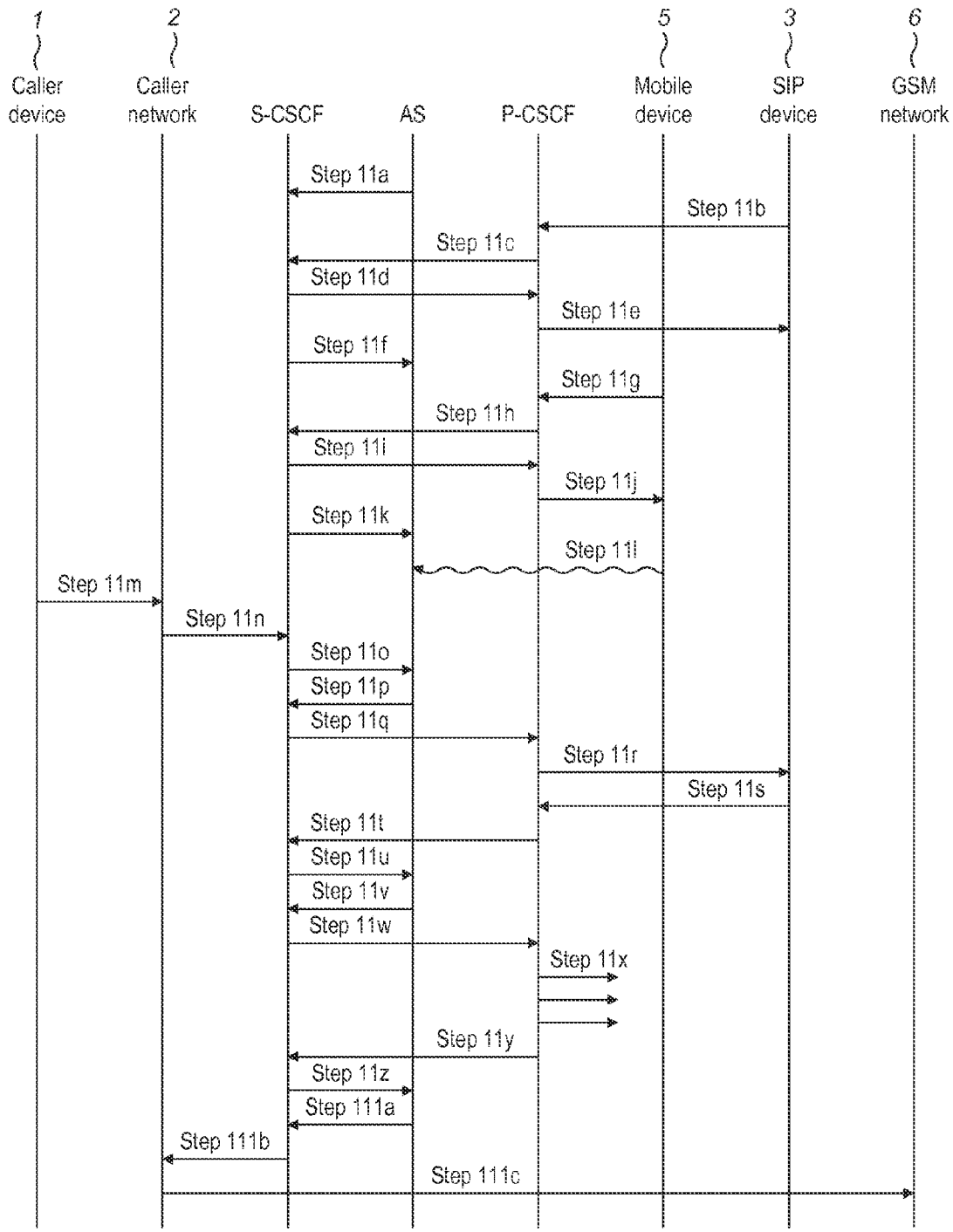
FIG. 11 (parts 1 and 2) depicts a flow diagram of the conditional delivery of the telecommunication data in the telecommunication system of FIG. 10.
Figure 11:
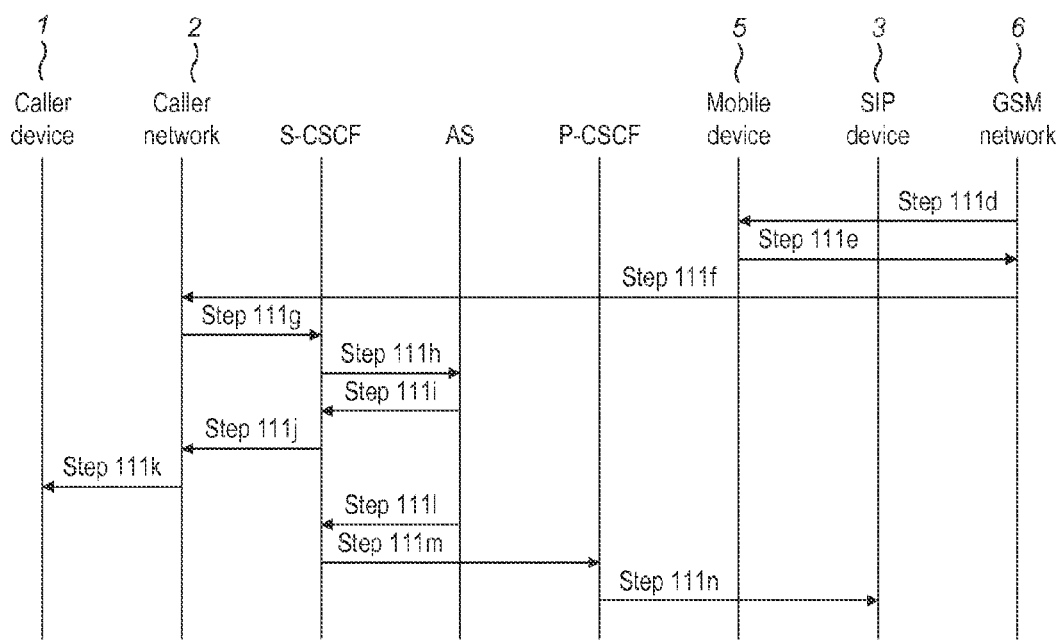

FIG. 11 (parts 1 and 2) depicts a flow diagram for the conditional telecommunication service according to the fourth embodiment.

Before the device-shared telephone dialling service is operational, the location of SIP device and the mobile device is registered with the IMS network. As part of this registration process, the Application Server subscribes to the S-CSCF for registration information for the subscriber (STEP 11a). When the SIP device registers with the S-CSCF (STEPS 11b and 11c) a GRUU1 is assigned to the SIP device (STEPS 11d and 11e). The Application Server learns about the registration of the SIP device and GRUU1 from a NOTIFY message issued by the S-CSCF (STEP 11f). When the mobile device registers with the S-CSCF (STEPS 11g and 11h) a GRUU2 is assigned to the mobile device (STEPS 11i and 11j). The Application Server learns about the registration of the mobile device and GRUU2 from a NOTIFY message issued by the S-CSCF (STEP 11k). The Application Server may identify GRUU2 is assigned to the mobile device when the mobile device contacts the Application Server directly using another protocol, such as HTTP (STEP 11*l*). In an alternative method not shown, the Application Server may identify GRUU2 is assigned to the mobile device by using an identifying feature in the REGISTER message of the mobile device which is also included in the NOTIFY message to the Application Server (STEP 11*k*).

Use of the device-shared telephone dialling service begins when a calling party wishes to make a call via their calling party telephone to a subscriber to the device-shared telephone dialling service.

The calling party dials the device-shared telephone dialling number for the subscriber which causes an initial call connection request to be transmitted to the calling party network as shown in STEP 11*m*. The calling party network is configured to generate an incoming call connection request for a call directed to the subscriber's telephone dialling number, which is transmitted to S-CSCF in STEP 11*n*.

On receiving the incoming call connection request, the S-CSCF first invokes the initial Filter Criteria. A call request is transferred to the Application Server so as to allow the Conditional SimRing service to be invoked (STEP 11*o*).

The Application Server initiates a first control phase and sends a first outgoing telecommunication request to the SIP device in the form of a SIP Invite GRUU 1 message as shown in STEPS 11*p* and 11*q* and 11*r*. The SIP device starts ringing when it receives the request and typically responds by sending a SIP 180 Ringing message back to the Application Server—see STEP 11*s*, 11*t* and 11*u*.

The Application Server sends a second outgoing telecommunication request to the mobile device in the form of a SIP Invite GRUU 2 message as shown in STEPS 11*v*, 11*w* and 11*x*. However, since IP connectivity has been lost, the second outgoing call connection request cannot reach the mobile device. After multiple attempts over a predetermined period of time, the P-CSCF sends a 408 Request Timeout message to the Application Server indicating that the second outgoing call connection request has failed (STEP 11*y* and 11*z*).

When the Application Server determines that the mobile device is uncontactable over the IP network it moves to a second control phase and uses a SimRing mechanism to route a third outgoing call connection request to the mobile device via the S-CSCF and the GSM network. See STEPS 111*a*, 111*b*, 111*c*, 111*d*. The mobile device starts ringing when it receives the request.

Both of the subscriber's telephony devices are now ringing, and in this case the subscriber answers the mobile device which causes an answer message to be transmitted from mobile device to the GSM network in STEP 111*e*. The mobile network indicates that it has been answered by transmitting a call connection response in STEP 111*f* in the form of an Answer Message. The Answer Message propagates back until the S-CSCF receives a 200 OK message—see STEPS 111*g* to 111*i*. The S-CSCF forwards the Answer message to calling party telephone in STEPS 111*j* and 111*k*.

A call is now connected between calling party telephone and the mobile device and media data (for example voice data) may flow between the two (the call is connected).

Since the SIP device was not answered by the subscriber, the Application Service cancels the call connection request to it, for example by transmitting a SIP Cancel message to SIP device in STEPS 111*l* to 111*n*. The SIP device stops ringing when it receives the Cancel message.

FIFTH EXAMPLE

Figure 12:
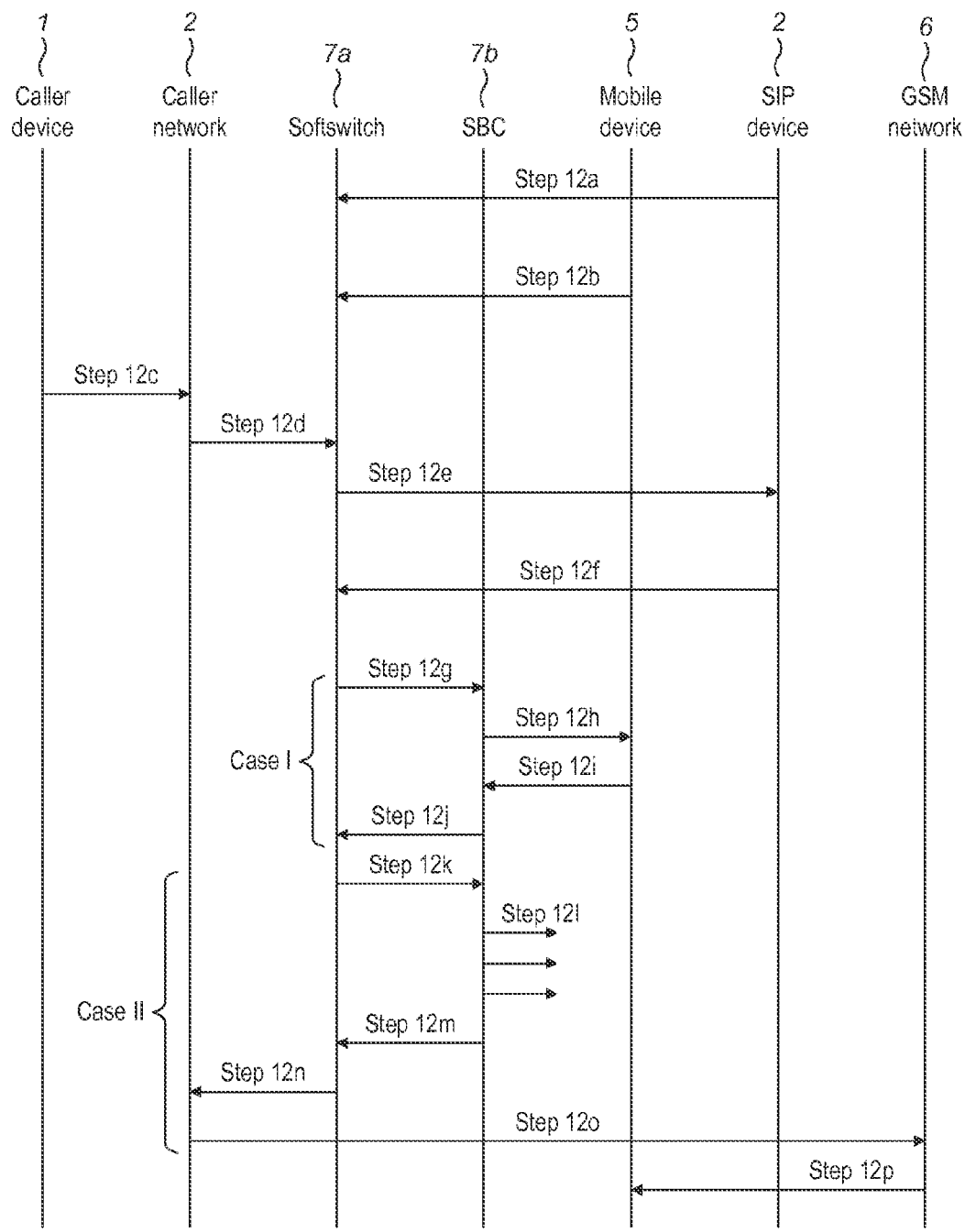
FIG. 12 depicts a flow diagram for the conditional delivery of telecommunication data in a fifth embodiment of a telecommunication system.

FIG. 12 depicts a flow diagram for a conditional telecommunication service according to an embodiment where the success or failure of the second outgoing telecommunication request can be determined without advance knowledge as to which of the subscriber's device is the mobile device.

In this particular conditional telecommunication service the subscriber has a SIP compliant fixed-line telephony device (3) that can communicate with a packet-switched network and a multi-mode mobile telephony device (6) that can communicate wirelessly with a packet-switched network using SIP and with a circuit-switched network (6). The conditional telecommunication service has a softswitch architecture comprising a softswitch (7*a*) and an SBC (7*b*) located between the softswitch and packet-switched network(s) of the subscriber telephony devices.

As with other conditional telecommunication services, the locations of the subscriber devices are registered with the softswitch (see STEPS 12*a* and 12*b*).

When the softswitch detects an incoming call from the caller (1) (see STEPS 12*c* and 12*d*), the softswitch initiates a first control phase and transmits a first outgoing call connection request to the SIP compliant fixed-line telephony device in the form of a first SIP INVITE message (see STEP 12*e*). The SIP device will start ringing when it receives the first SIP INVITE and responds by sending a SIP 180 RINGING message back to the softswitch (see STEP 12*f*). The softswitch also transmits a second outgoing call connection request to the multi-mode mobile telephony device in the form of a second SIP INVITE message, although at this time the softswitch hasn't identified this device specifically as the mobile device.

In case I, the second SIP INVITE message successfully reaches the mobile telephony device (see STEPS 12*g* and 12*h*). The mobile telephony device will start ringing when it receives the second SIP INVITE and respond by sending a SIP 180 RINGING message back to the softswitch (see STEPS 12*i* and 12*j*). The SIP 180 RINGING message will include information (a flag, tag) indicating that the message originated from the mobile telephony device. Thus, whilst monitoring the response messages from the subscriber devices, the softswitch will determine if the second SIP INVITE has successfully reached the mobile telephony device when it detects the response with the identifying information. The softswitch may then subsequently suppress any attempts to contact the mobile telephony device over the circuit-switched network.

In case II, where, despite multiple attempts, the second SIP INVITE message fails to reach the mobile telephony device (see STEPS 12*k* and 12*l*). Since the second SIP INVITE message fails to arrive, the mobile telephony device remains silent, no response message is sent back to the softswitch from the mobile telephony device and the SBC eventually issues a request time out response 408 (see STEP 12*m*). During the response monitoring process, the softswitch determines that no response to any SIP INVITE message contains the identifying information of the mobile device and therefore determines that mobile device is not reachable. Accordingly, the softswitch moves to a second control phase and seeks to ring the mobile telephony device over the circuit-switched network by issuing a third outgoing telecommunication (see STEP 12*n*-12*p*).

Once a device is answered by a subscriber, the relevant call leg is connected between the caller and answered device. Any other call legs are cancelled (not shown).

In various of the above embodiments, the telecommunication requests are call connection requests. Other telecommunication requests are envisaged. Depending on the type of communication, there may not be any "connection" as such. For example, the telecommunication request may be a Short Message Service (SMS) message delivery request. SMS can be carried either using a circuit-switched network, for example via a GSM network, or via a packet-switched network, for example an IP network. An SMS message can be sent to a device over a SIP session using a SIP "MESSAGE" message. In the first control phase of this embodiment, the packet-switched network link may be tried first (whilst also sending the SMS to a different device too), and if the transmittal of the message via the packet-switched network fails, in the second control phase of this embodiment, the circuit-switched network is used to convey the message to the device.

In the above embodiments, the control system transmits a second outgoing telecommunication request over the packet-switched network. However, in some embodiments the control system, whilst performing an operation to at least attempt to transmit such a request in the first phase, may not actually transmit the request. In particular, if the mobile device doesn't have a valid SIP registration (e.g. it has expired) then the control system, when performing the operation to at least attempt to transmit the request, may recognise that it does not have a valid IP address for the device and/or it may determine that the request is likely to fail for reasons such as lack of connectivity between the control system itself and the packet-switched network. Therefore the control system may not get as far as actually transmitting the request over the packet-switched network, before it moves to the second control phase. In addition, even if the transmission of the request itself is successful, some other condition may mean that the request is deemed by the control system to be unsuccessful. Hence, in the first control phase, the control system performs an operation to at least attempt to transmit the second outgoing request, but may not actually do so, and may deem the request to be unsuccessful even if the second outgoing telecommunication request is indeed transmitted.

Whilst in the above-described embodiments the second device is a mobile device, in alternative embodiments the second device may be a fixed device which is capable of communicating via both a packet-switched network link and via a circuit-switched network link. It may for example comprise an automated communication terminal having both a fixed line interface and a GSM radio interface.

Throughout the description and claims of this specification, the words "comprise" and "contain" and variations on the words, for example, "comprising" and "containing", means "including but not limited to", and is not intended to (and does not exclude) other components, integers or steps.

Throughout the description and claims of this specification, the singular encompasses the plural unless the context requires otherwise. In particular, where the indefinite article is used, the specification is to be used as contemplating plurality as well as singularity, unless the context requires otherwise.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of providing a telecommunication service to a subscriber of a telecommunication system wherein the subscriber has a plurality of associated telecommunication devices including a first device and a second device, each of said plurality of associated telecommunication devices is contactable via a device-shared identification address, the first device is capable of communicating with a telecommunications network, and the second device is capable of communicating with a packet-switched network and further capable of communicating with a circuit-switched network, the method comprising:
   a control system receiving an incoming telecommunication request associated with an incoming telecommunication request directed to the device-shared identification address for the subscriber, the incoming telecommunication request having been routed to the control system on the basis of the device-shared identification address;
   the control system initiating a first control phase, and in said first control phase:
   the control system transmitting a first outgoing telecommunication request over the telecommunications network to the first device using Session Initiation Protocol as a signaling protocol, and
   while the packet-switched network and the circuit-switched network are both available for communication with the second device, the control system performing an operation to at least attempt to transmit a second outgoing telecommunication request over the packet-switched network to the second device using Session Initiation Protocol as a signaling protocol, in preference to transmitting an outgoing telecommunication request over the circuit-switched network to the second device; and
   if the operation to at least attempt to transmit the second outgoing telecommunication request over the packet-switched network to the second device is deemed to be unsuccessful, the control system initiating a second control phase, and in said second control phase the control system transmitting a third outgoing telecommunication request over the circuit-switched network to the second device.

2. The method according to claim 1, wherein the first device and second device are telecommunication devices suitable for supporting one or more different types of telecommunication data.

3. The method according to claim 1, wherein the first device is a fixed-line device or a mobile device and the first device is capable of communicating with a packet-switched network or a circuit-switched network.

4. The method according to claim 1, wherein if the first device is contactable over a packet-switched network, then the first device and second device are capable of communicating with the same packet-switched network or if the first device is contactable over a circuit-switched network, then first device and second device are capable of communicating with the same circuit-switched network.

5. The method according to claim 1, wherein the device-shared identification address is a numeric, non-numeric or combination identity address.

6. The method according to claim 1, wherein the control system transmits the first outgoing telecommunication request to the first device and performs the operation to at least attempt to transmit the second outgoing telecommunication request to the second device in parallel so that the first and second devices can be contacted at substantially the same time in the first control phase.

7. The method according to claim 1, wherein the control system comprises one or more switching means to direct the outgoing telecommunication requests to different subscriber devices and/or across different telecommunications networks.

8. The method according to claim 7, wherein the control system comprises a softswitch.

9. The method according to claim 8, wherein the control system comprises a session border controller.

10. The method according to claim 1, wherein the control system comprises one or more nodes of an Internet Protocol Multimedia Subsystem (IMS) network including:
- a Serving-Call Session Control Function (S-CSCF) configured with a Public User Identity for the subscriber, a private user identity for the first device and a private user identity for the second device; and
- an Application Server (AS2) configured with a telecommunication service in association with the private user identity for the second device.

11. The method according to claim 1, wherein the control system comprises one or more nodes of an Internet Protocol Multimedia Subsystem comprising:
- a Serving-Call Session Control Function (S-CSCF) with initial Filter Criteria (iFC) configured for the subscriber; and
- an Application Server (AS) configured to fork telecommunication data to the first device and second device using Global Routing User Agent URIs (GRUUs) assigned to each device.

12. The method according to claim 1, wherein the control system comprises one or more nodes of an Internet Protocol Multimedia Subsystem comprising:
- a Serving-Call Session Control Function (S-CSCF); and
- an Application Server (AS) configured to fork telecommunication data to the first device using feature tags.

13. The method according to claim 1, further comprising identifying the second device.

14. The method according to claim 13, wherein the control system comprises one or more nodes of an Internet Protocol Multimedia Subsystem (IMS) network including:
- a Serving-Call Session Control Function (S-CSCF) configured with a Public User Identity for the subscriber, a private user identity for the first device and a private user identity for the second device; and
- an Application Server (AS2) configured with a telecommunication service in association with the private user identity of the second device,
- wherein identifying the second device comprises identifying the second device from information associated with registration of a soft client of the second device.

15. The method according to claim 14, wherein the information associated with the registration of the soft client is a distinctive user-agent header, a private address of record which a softswitch regards as an alias of the subscriber's normal address of record or a distinctive contact header.

16. The method according to claim 13, wherein the control system comprises one or more nodes of an Internet Protocol Multimedia Subsystem (IMS) network including:
- a Serving-Call Session Control Function (S-CSCF) configured with a Public User Identity for the subscriber, a private user identity for the first device and a private user identity for the second device; and
- an Application Server (AS2) configured with a telecommunication service in association with the private user identity of the second device,
- wherein identifying the second device comprises identifying the second device from information associated with registration of the second device with the private user identity of the second device of using initial Filter Criteria (iFC) configured for the second device.

17. The method according to claim 13, wherein the control system comprises one or more nodes of an Internet Protocol Multimedia Subsystem comprising:
- a Serving-Call Session Control Function (S-CSCF) with initial Filter Criteria (iFC) configured for the subscriber; and
- an Application Server (AS) configured to fork telecommunication data to the first device and second device using Global Routing User Agent URIs (GRUUs) assigned to each device,
- wherein identifying the second device comprises identifying the second device from identifying information associated with registration of a soft client of the second device and/or from the GRUUs assigned to the first device and the second device.

18. The method according to claim 1, further comprising determining if the second outgoing telecommunication request has succeeded or failed in reaching the second device over the packet-switched network.

19. The method according to claim 18, wherein if the second device has been identified, then determining if the second outgoing telecommunication request has succeeded or failed in reaching the second device comprises monitoring for a response to the second outgoing telecommunication request from the second device.

20. The method according to claim 19, wherein said monitoring is within a predetermined time period.

21. The method according to claim 18, wherein if the second device has not been identified, then determining if the second outgoing telecommunication request has succeeded or failed in reaching the second device may comprise monitoring for a response with a flag that indicates the response came from the second device.

22. The method according to claim 21, wherein said monitoring is within a predetermined time period.

23. The method according to claim 1, wherein transmitting the third outgoing telecommunication request over the circuit-switched network to the second device further comprises transmitting the third outgoing telecommunication request using an identification address that is unique to the second device.

24. The method according to claim 1, wherein transmitting the third outgoing telecommunication request over the circuit-switched network to the second device is based on a location query being sent to the subscriber database.

25. The method according to claim 1, further comprising in response to receiving a telecommunication response from one of the first device and the second device, cancelling the outgoing telecommunication request to the other of the first device and the second device.

26. A method of providing a telephony service to a subscriber of a telecommunication system, wherein the subscriber has a plurality of associated telephony devices including a first telephony device and a second telephony device, each of said plurality of associated telephony devices is contactable via a device-shared telephone dialling number, the first telephony device is capable of communicating with a telecommunications network, and the second telephony device is capable of communicating with a packet-switched network and further capable of communicating with a circuit-switched network, the method comprising:
- a control system receiving an incoming call connection request associated with an incoming call directed to the device-shared telephone dialling number for the subscriber, the incoming call connection request having been routed to the control system on the basis of the device-shared telephone dialling number;

the control system initiating a first control phase, and in said first control phase:

the control system transmitting a first outgoing call connection request over the telecommunications network to the first telephony device using Session Initiation Protocol as a signaling protocol, and while the packet-switched network and the circuit-switched network are both available for communication with the second device, the control system performing an operation to at least attempt to transmit a second outgoing call connection request over the packet-switched network to the second telephony device using Session Initiation Protocol as a signaling protocol, in preference to transmitting an outgoing call connection request over the circuit-switched network to the second telephony device;

if the operation to at least attempt to transmit the second outgoing call connection request over the packet-switched network to the second device is deemed to be unsuccessful, the control system initiating a second control phase, and in said second control phase the control system transmitting a third outgoing call connection request over the circuit-switched network to the second telephony device;

the control system receiving a call connection response from one of the first telephony device and the second telephony device; and the control system connecting said incoming call to said one of said first telephony device and the second telephony device.

27. An apparatus, comprising:

at least one processor; and at least one memory including computer program code;

the at least one memory and the computer program code being configured to cause the processor to perform a method of providing a telecommunication service to a subscriber of a telecommunication system, wherein the subscriber has a plurality of associated telecommunication devices including a first device and a second device, each of said plurality of associated telecommunication devices is contactable via a device-shared identification address, the first device is capable of communicating with a telecommunications network, and the second device is capable of communicating with a packet-switched network and further capable of communicating with a circuit-switched network, wherein the method comprises:

a control system receiving an incoming telecommunication request associated with an incoming telecommunication request directed to the device-shared identification address for the subscriber, the incoming telecommunication request having been routed to the control system on the basis of the device-shared identification address, the control system initiating a first control phase, and in said first control phase:

the control system transmitting a first outgoing telecommunication request over the telecommunications network to the first device using Session Initiation Protocol as a signaling protocol, and while the packet-switched network and the circuit-switched network are both available for communication with the second device, the control system performing an operation to at least attempt to transmit a second outgoing telecommunication request over the packet-switched network to the second device using Session Initiation Protocol as a signaling protocol, in preference to transmitting an outgoing telecommunication request over the circuit-switched network to the second device, and if the operation to at least attempt to transmit the second outgoing telecommunication request over the packet-switched network to the second device is deemed to be unsuccessful, initiating a second control phase, and in said second control phase the control system transmitting a third outgoing telecommunication request over the circuit-switched network to the second device.

28. An apparatus, comprising:

at least one processor; and at least one memory including computer program code;

the at least one memory and the computer program code being configured to cause the processor to perform a method of providing a telephony service to a subscriber of a telecommunication system, wherein the subscriber has a plurality of associated telephony devices including a first telephony device and a second telephony device, each of said plurality of associated telephony devices is contactable via a device-shared telephone dialling number, the first telephony device is capable of communicating with a telecommunications network, and the second telephony device is capable of communicating with a packet-switched network and further capable of communicating with a circuit-switched network, wherein the method comprises:

a control system receiving an incoming call connection request associated with an incoming call directed to the device-shared telephone dialling number for the subscriber, the incoming call connection request having been routed to the control system on the basis of the device-shared telephone dialling number, the control system initiating a first control phase, and in said first control phase:

the control system transmitting a first outgoing call connection request over the telecommunications network to the first telephony device using Session Initiation Protocol as a signaling protocol, and while the packet-switched network and the circuit-switched network are both available for communication with the second device, the control system performing an operation to at least attempt to transmit a second outgoing call connection request over the packet-switched network to the second telephony device using Session Initiation Protocol as a signaling protocol, in preference to transmitting an outgoing call connection request over the circuit-switched network to the second telephony device, if the operation to at least attempt to transmit the second outgoing call connection request over the packet-switched network to the second device is deemed to be unsuccessful, the control system initiating a second control phase, and in said second control phase the control system transmitting a third outgoing call connection request over the circuit-switched network to the second telephony device, the control system receiving a call connection response from one of the first telephony device and the second telephony device, and the control system connecting said incoming call to said one of said first telephony device and the second telephony device.

29. A computer program product comprising a non-transitory computer-readable storage medium having computer readable instructions stored thereon, the computer readable instructions being executable by a computerized device to cause the computerized device to perform a method of providing a telecommunication service to a subscriber of a telecommunication system wherein the subscriber has a plurality of associated telecommunication devices including a first device and a second device, each of said plurality of associated telecommunication devices is contactable via a device-shared identification address, the first device is capable of communicating with a telecommunications network, and the second device is capable of communicating with a packet-switched network and further capable of communicating with a circuit-switched network, wherein the method comprises:

a control system receiving an incoming telecommunication request associated with an incoming telecommunication request directed to the device-shared identification address for the subscriber, the incoming telecommunication request having been routed to the control system on the basis of the device-shared identification address, the control system initiating a first control phase, and in said first control phase:

the control system transmitting a first outgoing telecommunication request over the telecommunications network to the first device using Session Initiation Protocol as a signaling protocol, and while the packet-switched network and the circuit-switched network are both available for communication with the second device, the control system performing an operation to at least attempt to transmit a second outgoing telecommunication request over the packet-switched network to the second device using Session Initiation Protocol as a signaling protocol, in preference to transmitting an outgoing telecommunication request over the circuit-switched network to the second device, and if the operation to at least attempt to transmit the second outgoing telecommunication request over the packet-switched network to the second device is deemed to be unsuccessful, initiating a second control phase, and in said second control phase the control system transmitting a third outgoing telecommunication request over the circuit-switched network to the second device.

30. A computer program product comprising a non-transitory computer-readable storage medium having computer readable instructions stored thereon, the computer readable instructions being executable by a computerized device to cause the computerized device to perform a method of providing a telephony service to a subscriber of a telecommunication system, wherein the subscriber has a plurality of associated telephony devices including a first telephony device and a second telephony device, each of said plurality of associated telephony devices is contactable via a device-shared telephone dialling number, the first telephony device is capable of communicating with a telecommunications network, and the second telephony device is capable of communicating with a packet-switched network and further capable of communicating with a circuit-switched network, wherein the method comprises:

a control system receiving an incoming call connection request associated with an incoming call directed to the device-shared telephone dialling number for the subscriber, the incoming call connection request having been routed to the control system on the basis of the device-shared telephone dialling number, the control system initiating a first control phase, and in said first control phase:

the control system transmitting a first outgoing call connection request over the telecommunications network to the first telephony device using Session Initiation Protocol as a signaling protocol, and while the packet-switched network and the circuit-switched network are both available for communication with the second device, the control system performing an operation to at least attempt to transmit a second outgoing call connection request over the packet-switched network to the second telephony device using Session Initiation Protocol as a signaling protocol, in preference to transmitting an outgoing call connection request over the circuit-switched network to the second telephony device, if the operation to at least attempt to transmit the second outgoing call connection request over the packet-switched network to the second device is deemed to be unsuccessful, the control system initiating a second control phase, and in said second control phase the control system transmitting a third outgoing call connection request over the circuit-switched network to the second telephony device, the control system receiving a call connection response from one of the first telephony device and the second telephony device, and the control system connecting said incoming call to said one of said first telephony device and the second telephony device.

\* \* \* \* \*